US012609407B2

(12) United States Patent
Wu et al.

(10) Patent No.: US 12,609,407 B2
(45) Date of Patent: Apr. 21, 2026

(54) PRESSURE RELIEF COMPONENT, BATTERY CELL, BATTERY AND ELECTRICAL APPARATUS

(71) Applicant: CONTEMPORARY AMPEREX TECHNOLOGY CO., LIMITED, Ningde (CN)

(72) Inventors: Kai Wu, Ningde (CN); Zhongbao Huang, Ningde (CN); Wenfa Lin, Ningde (CN); Biao Huang, Ningde (CN); Weike Chen, Ningde (CN); Chengtao Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/322,650

(22) Filed: Sep. 8, 2025

(65) Prior Publication Data

US 2026/0005385 A1     Jan. 1, 2026

Related U.S. Application Data

(63) Continuation of application No. PCT/CN2023/121163, filed on Sep. 25, 2023.

(30) Foreign Application Priority Data

Jul. 11, 2023     (CN) .......................... 202310844856.6

(51) Int. Cl.
*H01M 50/342*          (2021.01)

(52) U.S. Cl.
CPC .... *H01M 50/3425* (2021.01); *H01M 2220/20* (2013.01)

(58) Field of Classification Search
CPC ...................... H01M 50/3425; H01M 2220/20
See application file for complete search history.

(56) References Cited

FOREIGN PATENT DOCUMENTS

| CN | 109860448 A | 6/2019 |
| CN | 214313611 U | 9/2021 |

(Continued)

OTHER PUBLICATIONS

English translation of CN216872186 to Chen Long et al; obtained via Google Patents Nov. 18, 2025 (Year: 2025).*

(Continued)

*Primary Examiner* — Sarah A. Slifka
(74) *Attorney, Agent, or Firm* — K&L Gates LLP

(57) ABSTRACT

A pressure relief component, a battery cell, a battery and an electrical apparatus, belonging to the technical field of batteries. The pressure relief component includes a mounting member and a pressure relief valve plate; the mounting member is provided with an opening, the mounting member is provided with sinking recesses around a circumferential direction of the opening, and each sinking recess includes a recess bottom wall and a recess side wall; and the pressure relief valve plate covers the opening, and the pressure relief valve plate includes a body part and mounting parts, the body part being provided with weak areas, the mounting parts being connected to a periphery of the body part, and the mounting parts being bent to be supported on the recess bottom walls and being welded to the recess side walls.

17 Claims, 4 Drawing Sheets

1000

(56) References Cited

FOREIGN PATENT DOCUMENTS

| | | | |
|----|-------------|---|--------|
| CN | 216872186   | U | 7/2022 |
| CN | 217387440   | U | 9/2022 |
| CN | 218274967   | U | 1/2023 |
| CN | 115803962   | A | 3/2023 |
| CN | 218602564   | U | 3/2023 |
| CN | 116207434   | A | 6/2023 |
| CN | 116231221   | A | 6/2023 |
| CN | 116247346   | A | 6/2023 |
| CN | 116315414   | A | 6/2023 |
| CN | 116581466   | A | 8/2023 |
| KR | 20230091028 | A | 6/2023 |

OTHER PUBLICATIONS

English translation of CN218602564 to Chen Shengwang et al; obtained via Google Patents Nov. 18, 2025 (Year: 2025).*

International Search Report in the international application No. PCT/CN2023/121163, dated Mar. 29, 2024, 6 pages with English translation.

ISA Written Opinion in the international application No. PCT/CN2023/121163, dated Mar. 29, 2024, 12 pages with English translation.

First Office Action in the CN application No. 202310844856.6, dated Aug. 16, 2023, 22 pages with English translation.

Grant Notice in the CN application No. 202310844856.6, dated Sep. 7, 2023, 9 pages with English translation.

* cited by examiner

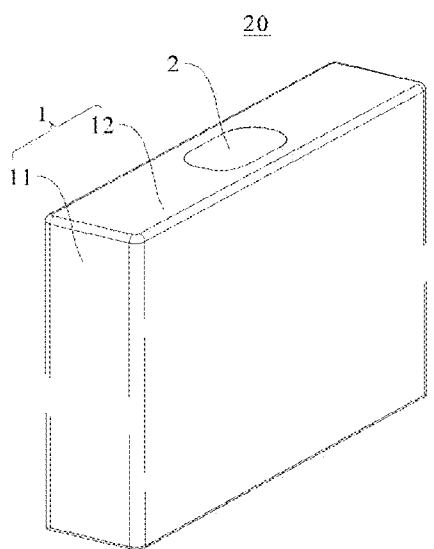
FIG. 3
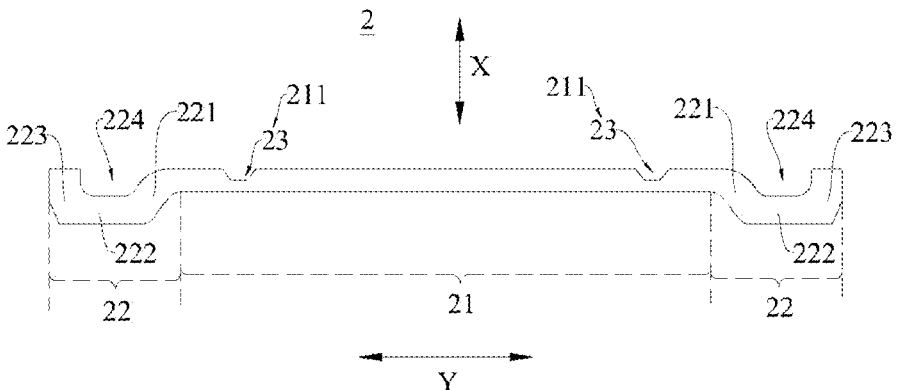
FIG. 4
FIG. 5

PRESSURE RELIEF COMPONENT, BATTERY CELL, BATTERY AND ELECTRICAL APPARATUS

CROSS-REFERENCE TO RELATED APPLICATIONS

The present application is a continuation of International Application No. PCT/CN2023/121163, filed Sep. 25, 2023, which is based on and claims priority to Chinese Patent Application No. 202310844856.6, filed on Jul. 11, 2023, the entire disclosure of which is incorporated herein by reference.

TECHNICAL FIELD

The present application relates to the technical field of batteries, and in particular, to a pressure relief component, a battery cell, a battery and an electrical apparatus.

BACKGROUND

In recent years, new energy vehicles have been developed with a great leap. In the field of electric vehicles, batteries play an irreplaceably important role as a power source of the electric vehicle. There is a high requirement for reliability of the battery as a core component of the new energy vehicle. In order to improve the reliability of the battery, a pressure relief mechanism is usually disposed on the housing of the battery, but some pressure relief mechanisms have the problem of early valve opening, which needs to be solved.

SUMMARY

Embodiments of the present application provide a pressure relief component, a battery cell, a battery and an electrical apparatus, which can improve the problem of early valve opening of a pressure relief valve plate.

According to a first aspect, an embodiment of the present application provides a pressure relief component for a battery cell, where the pressure relief component includes a mounting member and a pressure relief valve plate. The mounting member is provided with an opening, and the pressure relief valve plate covers the opening. The mounting member is provided with sinking recesses around a circumferential direction of the opening, and each sinking recess includes a recess bottom wall and a recess side wall; and the pressure relief valve plate includes a body part and mounting parts, the body part being provided with weak areas, the mounting parts being connected to a periphery of the body part, and the mounting parts being bent to be supported on the recess bottom walls and being welded to the recess side walls.

In the above technical solution, on the one hand, setting the mounting part on the periphery of the body part in a bent form can eliminate stress through the bent structure, which is beneficial to improve the adverse effect of the welding stress on the weak area of the pressure relief valve plate during the welding process between the pressure relief valve plate and the mounting member, improving the problem of early valve opening, enhancing the accuracy of the valve opening timing of the pressure relief valve plate during its service, and also being beneficial to improve the vibration resistance of the pressure relief valve plate and the stability and reliability of the pressure relief valve plate during its service. On the other hand, supporting the mounting part on the recess bottom wall and welding it to the recess side wall can improve the deformation problem of the pressure relief valve plate during the welding process between the pressure relief valve plate and the mounting member through the support of the recess bottom wall on the mounting part, reducing the occurrence of problems such as edge warping deformation of the mounting part during welding, and improving the welding quality, so as to further improve the stability and reliability of the pressure relief valve plate during its service.

In some embodiments, the mounting part includes a cantilever section, a connecting section and a welding section sequentially connected from inside to outside in a radial direction of the opening, the connecting section is supported on the recess bottom wall, the cantilever section is suspended in the opening and/or the sinking recess, and the cantilever section and the welding section are both bent toward a notch of the sinking recess relative to the connecting section, so that a clearance recess is formed among the cantilever section, the connecting section and the welding section, and the welding section is welded to the recess side wall.

In the above technical solution, by setting the mounting part to the above structural form, the adverse effect of the welding stress on the weak area of the pressure relief valve plate can be effectively improved, and the stress distribution of the pressure relief valve plate during its service can be improved, so that the stress is more uniform, the vibration resistance and fatigue resistance of the pressure relief valve plate are improved, and the service reliability and stability of the pressure relief valve plate are further improved. In addition, the mounting part in the above structural form is simple in structure and easy to process.

In some embodiments, a side surface of the connecting section facing the recess bottom wall includes a first planar section, and the first planar section is in surface contact and support fit with the recess bottom wall.

In the above technical solution, by supporting the recess bottom wall with the first planar section, the effect of surface contact and fit between the two is achieved instead of line contact or point contact, which can increase the contact area between the connecting section and the recess bottom wall, improve the stability of the contact and support fit, and is beneficial to better improve the deformation problem of the pressure relief valve plate caused by the welding tensile stress during welding along the circumferential direction of the pressure relief valve plate. Also, during welding, the welding heat can be conducted away from the recess bottom wall to a greater extent, which is beneficial to better reduce the deformation problem of the pressure relief valve plate caused by the welding thermal stress. Also, the vibration received by the pressure relief valve plate during its service can also be transferred to the recess bottom wall to a greater extent, so as to improve the problem of damage to the pressure relief valve plate caused by the vibration.

In some embodiments, the first planar section is an annular plane surrounding an entire circumference of the body part.

In the above technical solution, by setting the first planar section in the form of a continuously extending entire circumference, the mounting part can be stably supported on the recess bottom wall at any position in the entire circumferential direction, which is beneficial to further increase the contact area between the mounting part and the recess bottom wall, improving the stability of the support fit, improving the heat transfer efficiency, increasing the vibration transfer range, and the like, and better protecting the pressure relief valve plate.

In some embodiments, a side surface of the connecting section away from the recess bottom wall includes a second planar section, and at least a part of a projection of the second planar section on the first planar section along an axial direction of the opening falls within the first planar section.

In the above technical solution, the connecting section is easy to be processed and formed, so that the connecting section has a relatively uniform wall thickness, a stable shape, and good stress stability. Also, it is beneficial to obtain a larger first planar section, so as to further improve the stability of the contact and support fit between the mounting part and the recess bottom wall, and further increase the contact area of heat transfer and vibration transfer between the mounting part and the recess bottom wall.

In some embodiments, a radial width $W1$ of the second planar section is smaller than a radial width $W2$ of the first planar section; and/or the radial width $W2$ of the first planar section is 0.5-8 times a wall thickness $T1$ of the body part, and the radial width $W1$ of the second planar section is 0.1-5 times the wall thickness $T1$ of the body part.

In the above technical solution, it is easy to set the radial width of the first planar section to be relatively large, so as to increase the contact area between the first planar section and the recess bottom wall, which is beneficial to further improve the stability of the contact and support fit between the mounting part and the recess bottom wall, and further increasing the contact area of heat transfer and vibration transfer between the mounting part and the recess bottom wall.

In some embodiments, a wall thickness $T3$ of the connecting section is 0.75-1.2 times the wall thickness $T1$ of the body part; and/or an axial depth $H2$ of the clearance recess is 0.5-3 times the wall thickness $T1$ of the body part.

In the above technical solution, by setting $T3$ to be greater than or equal to $0.75T1$ and less than or equal to $1.2T1$, the thickness of the connecting section is not too thin, improving the reliability of the supporting contact with the recess bottom wall, and the thickness of the connecting section is not too thick, which is beneficial to leave a sufficient depth for the clearance recess, so that the clearance recess can effectively play the role of releasing tensile stress. By setting $H2$ to be greater than or equal to $0.5T1$ and less than or equal to $3T1$, the depth of the clearance recess makes it have good processability, the shape of the processed clearance recess is relatively stable and reliable, and the depth of the clearance recess is not too shallow, so that the clearance recess can effectively play the role of releasing tensile stress, and the depth of the clearance recess is not too deep, which is beneficial to leave a sufficient wall thickness for the connecting section and improving the reliability of the supporting contact between the connecting section and the recess bottom wall.

In some embodiments, a projection of the weak area on the mounting part along the radial direction of the opening falls within the clearance recess.

In the above technical solution, when the welding stress between the welding section and the recess side wall is transferred toward the weak area along the radial direction of the opening, the clearance recess can release the welding stress transferred toward the weak area, thereby more effectively improving the adverse effect of the welding stress on the weak area.

In some embodiments, a projection of the body part on the mounting part along the radial direction of the opening entirely falls within the clearance recess.

In the above technical solution, when the welding stress between the welding section and the recess side wall is transferred toward the weak area along the radial direction of the opening, the clearance recess can more fully release the welding stress transferred toward the weak area, thereby more effectively improving the adverse effect of the welding stress on the weak area.

In some embodiments, the connecting section is connected to at least one of the cantilever section and the welding section through a chamfer.

In the above technical solution, the problem of stress concentration caused by the transition of a large bending angle at the corresponding connection can be improved, and the structural reliability of the pressure relief valve plate can be enhanced. When the pressure relief valve plate is welded or subjected to stress during its service, problems such as fracture are not easy to occur.

In some embodiments, an end of the cantilever section away from the connecting section is bent and connected to an edge of the body part, so that the cantilever section is inclined relative to the body part.

In the above technical solution, the cantilever section is directly connected to the body part instead of indirectly. Also, by setting the cantilever section to extend obliquely relative to the body part along the direction from the body part to the connecting part, the cantilever section can be suspended relative to the opening and/or the sinking recess. In this way, the body part is only composed of the cantilever section, the connecting section and the welding section, which has a simple structure, occupies a small space and is easy to process.

In some embodiments, an axial height difference $H1$ between a surface of the body part on a thickness side close to the recess bottom wall and a surface of the connecting section on the thickness side close to the recess bottom wall is 0.5-2 times the wall thickness $T1$ of the body part.

In the above technical solution, by setting $H1$ to be greater than or equal to $0.5T1$ and less than or equal to $2T1$, the extension distance of the cantilever section in the axial direction of the opening may not be too short, so that the opening position and depth of the clearance recess can easily release the welding stress, and the connecting section can have a certain thickness to ensure reliable contact and support with the recess bottom wall. Also, the extension distance of the cantilever section in the axial direction of the opening may not be too long, which is beneficial to reduce the space occupied by the pressure relief valve plate in the axial direction of the opening, improving the structural compactness of the battery cell and increasing the energy density of the battery cell per unit volume.

In some embodiments, a wall thickness $T4$ of the cantilever section is greater than or equal to the wall thickness $T1$ of the body part.

In the above technical solution, by setting the wall thickness $T4$ of the cantilever section to be greater than or equal to the wall thickness $T1$ of the body part, the wall thickness of the cantilever section is relatively large, which can more effectively balance the overall stress of the pressure relief valve plate during welding and service, and better play the role of releasing stress and buffering vibration, so as to better protect the weak area from the influence of welding stress and improve the service stability and reliability of the pressure relief valve plate.

In some embodiments, the wall thickness $T4$ of the cantilever section is 1.1-1.8 times the wall thickness $T1$ of the body part.

In the above technical solution, by setting T4 to be greater than or equal to 1.1T1 and less than or equal to 1.8T1, the difference between the wall thicknesses of the cantilever section and the body part is not too large, thereby improving the processability of the pressure relief valve plate, and the wall thickness of the cantilever section can meet the requirement of being greater than the wall thickness of the body part, so that the cantilever section can effectively balance the overall stress of the pressure relief valve plate during welding and service, and effectively play the role of releasing stress and buffering vibration, so as to better protect the weak area from the influence of welding stress and improve the service stability and reliability of the pressure relief valve plate.

In some embodiments, the body part is connected to the cantilever section through a chamfer.

In the above technical solution, the problem of stress concentration caused by the transition of a large bending angle at the connection between the body part and the cantilever section can be improved, and the reliability of the cantilever section in absorbing stress or vibration can be improved, so that the cantilever section can more effectively play the role of releasing stress and buffering vibration, and improve the effect of the cantilever section in balancing the overall stress of the pressure relief valve plate during welding and service.

In some embodiments, at least an end of the welding section away from the recess bottom wall is entirely hot-melted into a welding mark, so that the welding mark constitutes a partial recess wall of the clearance recess.

In the above technical solution, the size of the clearance recess is sufficient. During the welding process, the clearance recess can always be used to release stress, which is beneficial to improve the effectiveness of the micro-deformation of the cantilever section and the welding section, and plays a protective role in reducing stress transfer to the weak area.

In some embodiments, a wall thickness T2 of the welding section is 0.75-1.5 times the wall thickness T1 of the body part.

In the above technical solution, when the welding section is welded to the recess side wall of the sinking recess, by setting T2 to be greater than or equal to 0.75T1 and less than or equal to 1.5T1, the thickness of the welding section may not be too thin, and there is a relatively sufficient thickness for hot melting, resulting in relatively high connection reliability after welding. Moreover, the thickness of the welding section may not be too thick, and the molten pool formed during welding of the welding section can spread into the clearance recess, improving the good fluidity of the molten pool, enhancing the welding quality, and being beneficial to release the welding stress and reducing the adverse effect of the welding stress on the weak area.

In some embodiments, a side wall face of the welding section facing the recess side wall in a wall thickness direction is a welding side wall, the welding side wall includes a welding wall section and a guide wall section, the guide wall section is connected to a side of the welding wall section close to the recess bottom wall, and the guide wall section extends obliquely in a direction toward the recess bottom wall and in a direction gradually approaching the body part relative to the welding wall section.

In the above technical solution, when the mounting part is assembled to the sinking recess, since the guide wall section has an inwardly converging structure relative to the welding wall section, the guide wall section can play a guiding role, improving the assembly efficiency of the pressure relief valve plate and the mounting member, and enabling the assembly to proceed smoothly. Also, since the welding wall section has an outwardly expanding structure relative to the guide wall section, the welding wall section can be utilized to stably match with the recess side wall of the sinking recess, thereby improving the welding yield of the two.

In some embodiments, an axial height H4 of the welding side wall is 1-5 times the wall thickness T1 of the body part; and/or an axial height H3 of the welding wall section is 0.5-3 times the wall thickness T1 of the body part.

In the above technical solution, by setting H4 to be greater than or equal to T1 and less than or equal to 5T1, when the welding side wall is welded to the recess side wall of the sinking recess, the axial height of the welding side wall may not be too short, and there is a relatively sufficient length to set the welding wall section and the guide wall section, which is beneficial to optimize the welding effect of the welding wall section and the guiding effect of the guide wall section. Moreover, the axial height of the welding side wall may not be too long, which can reduce the depth of the sinking recess matched with the welding side wall, contributing to reducing the thickness of the mounting member, facilitating the lightweight design, and reducing the space occupied by the mounting member. By setting H3 to be greater than or equal to 0.5T1 and less than or equal to 3T1, when the welding wall section is welded to the recess side wall of the sinking recess, the axial height of the welding wall section may not be too short, and there is a relatively sufficient length for hot melting, resulting in relatively high connection reliability after welding. Moreover, the axial height of the welding wall section may not be too long, which can reduce the depth of the sinking recess welded to the welding wall section, contributing to reducing the thickness of the mounting member, facilitating the lightweight design, and reducing the space occupied by the mounting member.

In some embodiments, a radial width W3 of an orthographic projection of the guide wall section along the axial direction of the opening is 0.1-0.5 times the wall thickness T1 of the body part.

In the above technical solution, by setting W3 to be greater than or equal to 0.1T1 and less than or equal to 0.5T1, the radial width of the guide wall section may not be too small, and it has a more effective guiding effect. Also, when the radial widths of the mounting part and the cantilever section are fixed, the above setting ensures that the radial width of the guide wall section is not too large, leaving space for increasing the radial width of the connecting section, thereby improving the stability of the contact support between the connecting section and the recess bottom wall and enhancing the positioning effect and welding quality when the pressure relief valve plate is assembled to the mounting member.

In some embodiments, the weak area is a thinning recess, and an opening direction of the thinning recess is the same as or opposite to an opening direction of the clearance recess.

In the above technical solution, since the opening direction of the thinning recess can be the same as or opposite to the opening direction of the clearance recess, the flexible processing of the pressure relief valve plate can be achieved, and the requirements of different application scenarios can be met, enriching the applicable scenarios of the pressure relief valve plate.

In some embodiments, a contour line of the thinning recess is of an annular shape with an opening having a same contour shape as the pressure relief valve plate and being concentrically disposed, and a distance between the thinning recess and a center of the mounting part is greater than a distance between the thinning recess and an edge of the mounting part.

In the above technical solution, the profile of the thinning recess is simple and easy to process, and it can more reliably achieve valve opening.

In some embodiments, the mounting member has a first side and a second side in a thickness direction, the sinking recess is formed on an end wall of the first side of the mounting member, and the notch of the sinking recess opens toward a direction of the first side; or the sinking recess is formed on an end wall of the second side of the mounting member, and the notch of the sinking recess opens toward a direction of the second side.

In the above technical solution, the pressure relief valve plate is not limited to being mounted on the inner side or the outer side of the mounting member. Therefore, it can achieve flexible mounting of the pressure relief valve plate and can meet the mounting requirements of different forms of mounting members, enriching the applicable scenarios of the pressure relief valve plate. When the pressure relief valve plate is mounted on the side of the mounting member facing away from the accommodating cavity, the conductive metal such as welding slag can be more effectively prevented from falling into the accommodating cavity, thereby improving the reliability of the battery cell.

In some embodiments, the pressure relief valve plate is stamped to form the mounting part and the body part, and the body part is of a flat plate structure with an equal thickness.

In the above technical solution, the manufacturing process of the pressure relief valve plate is simple, and it can be easily realized that the wall thickness of each position of the mounting part meets the design requirements. Also, since the bent form of the mounting part can play a role in protecting the weak area, the body part does not need to be specially processed to protect the weak area, and a flat plate structure with an equal thickness is sufficient, which is beneficial to simplify the structure and processing of the body part.

In a second aspect, an embodiment of the present application further provides a battery cell, including: a housing and an electrode assembly. The electrode assembly is disposed in the housing, and the housing includes the above pressure relief component.

In the above technical solution, since the service reliability and stability of the pressure relief component of the embodiment of the present application can be improved, it is beneficial to improve the service reliability and stability of the battery cell.

In some embodiments, the housing includes a housing body and a housing cover, the housing cover covers an open position of the housing body, and one of the housing body and the housing cover constitutes the mounting member.

In the above technical solution, the pressure relief valve plate can be mounted on either the housing body or the housing cover, so that the mounting position of the pressure relief valve plate can be flexibly selected to improve the design flexibility of the battery cell.

In a third aspect, an embodiment of the present application further provides a battery, including the above battery cell.

In the above technical solution, since the service reliability and stability of the battery cell of the embodiment of the present application can be improved, it is beneficial to improve the service reliability and stability of the battery.

In a fourth aspect, an embodiment of the present application further provides an electrical apparatus, including the above battery.

In the above technical solution, since the service reliability and stability of the battery of the embodiment of the present application can be improved, it is beneficial to improve the working reliability and stability of the electrical apparatus.

DESCRIPTION OF DRAWINGS

To describe the technical solutions in the embodiments of the present application more clearly, the following briefly describes the accompanying drawings required for describing the embodiments. It should be understood that the following accompanying drawings show only some embodiments of the present application, and therefore should not be considered as a limitation on the scope. A person of ordinary skill in the art may further obtain other related accompanying drawings according to these accompanying drawings without creative efforts.

FIG. 3 is a schematic structural diagram of a battery cell provided in some embodiments of the present application;

FIG. 4 is a sectional view of a pressure relief component of a battery cell provided in some embodiments of the present application;

FIG. 5 is a schematic structural diagram of the pressure relief valve plate shown in FIG. 4;

Figure 1:
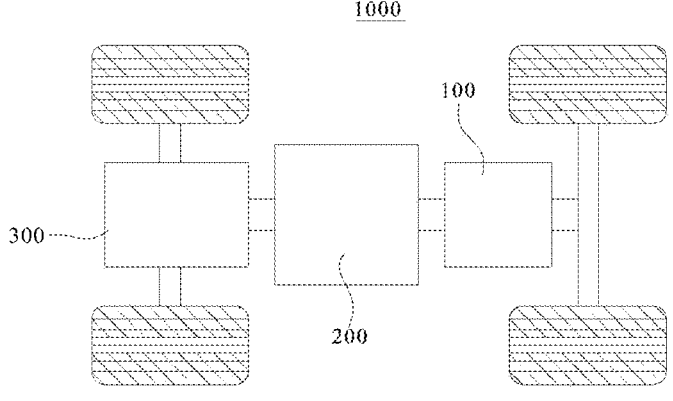
FIG. 1 is a schematic structural diagram of a vehicle according to some embodiments of the present application.

Reference signs: vehicle 1000; battery 100; controller 200; motor 300; box body 10; first box body 101; second box body 102; battery cell 20; pressure relief component 201; housing 1; housing body 11; housing cover 12; accommodating cavity 13; pressure relief valve plate 2; body part 21; weak area 211; thinning recess 23; mounting part 22; cantilever section 221; connecting section 222; first planar section 2221; second planar section 2222; welding section 223; welding side wall 2231; welding wall section 22311; guide wall section 22312; clearance recess 224; first chamfer 225; second chamfer 226; third chamfer 227; fourth chamfer 228; fifth chamfer 2291; sixth chamfer 2292; mounting member 3; opening 31; sinking recess 32; recess bottom wall 321; recess side wall 322; notch of the sinking recess 323; insulating member 4; first direction X; and second direction Y.

DESCRIPTION OF EMBODIMENTS

To make the objectives, technical solutions, and advantages of embodiments of the present application clearer, the following clearly describes the technical solutions in the embodiments of the present application with reference to the drawings in the embodiments of the present application. Clearly, the described embodiments are some but not all of the embodiments of the present application. All other embodiments obtained by a person skilled in the art based on the embodiments of the present application without making creative efforts shall fall within the protection scope of the present application.

Unless otherwise defined, all technical and scientific terms used in the present application have the same meaning as commonly understood by a person skilled in the art of the present application. In the present application, the terms used in the description of the present application are only used for describing specific embodiments and are not intended to limit the present application, and the terms "comprise", "have", and any variations thereof in the description and claims of the present application and the above description of the drawings are intended to cover a non-exclusive inclusion. The terms "first", "second", and the like in the description and claims of the present application or in the drawings are used to distinguish between different objects, and are not used to describe a specific sequence or a primary-secondary relationship.

An "embodiment" in the present application means that a specific feature, structure, or characteristic described with reference to the embodiment may be included in at least one embodiment of the present application. The phrase in various places in the description does not necessarily all refer to the same embodiment, or a separate or alternative embodiment mutually exclusive of other embodiments.

In the description of the present application, it should be noted that, unless explicitly specified and defined otherwise, the terms "mount", "couple", "connect", and "attach" are to be understood in a broad sense. For example, the terms may indicate a fixed connection, a detachable connection, or an integral connection, and may indicate a direct connection or an indirect connection implemented via an intermediate medium, or internal communication between two elements. A person skilled in the art can understand specific meanings of these terms in the present application according to specific situations.

The term "and/or" in the present application is only an associative relationship for describing associated objects, indicating that three relationships may be present. For example, A and/or B may indicate three cases: presence of only A; presence of both A and B; and presence of only B. In addition, the symbol "/" in the present application generally represents an "or" relationship between associated objects.

In some embodiments of the present application, the same reference signs denote the same component, and a detailed description of the same component is omitted in different embodiments for the sake of brevity. It should be understood that the dimensions of various components, such as the thickness, length, and width, and the dimensions of an integrated device, such as the overall thickness, length, and width, in the embodiments of the present application shown in the figures are merely illustrative and should not be construed as limiting the present application.

The term "a plurality of" in the present application refers to more than two, including two.

In the present application, the battery cell may include a lithium-ion secondary battery, a lithium-ion primary battery, a lithium-sulfur battery, a sodium-lithium ion battery, a sodium-ion battery, a magnesium-ion battery, or the like, which is not limited in the embodiments of the present application. The battery cell may be in a shape of a cylinder, a flat body, a cuboid, or the like, which is not limited in the embodiments of the present application. The battery cell is generally classified into three types according to a packaging manner: a cylindrical battery cell, a square battery cell, and a pouch battery cell, which is not limited in the embodiments of the present application.

A battery mentioned in the embodiments of the present application refers to a single physical module including one or a plurality of battery cells to provide a higher voltage and capacity. For example, the battery mentioned in the present application may include a battery module or a battery pack, or the like. The battery module generally includes a plurality of battery cells. The battery pack generally includes a box body for encapsulating one or more battery cells or one or more battery modules. The box body can prevent liquids or other foreign objects from affecting the charging or discharging of the battery cells.

The battery cell generally includes an electrode assembly, an electrolyte solution and a housing. The electrode assembly includes a positive electrode sheet, a negative electrode sheet, and a separator. Working of the battery cell mainly relies on migration of metal ions between the positive electrode plate and the negative electrode plate.

The positive electrode plate may generally include a positive electrode current collector and a positive electrode active substance layer. The positive electrode active substance layer is directly or indirectly coated on the positive electrode current collector. The positive electrode current collector not coated with the positive electrode active substance layer protrudes from the positive electrode current collector coated with the positive electrode active substance layer, and the positive electrode current collector not coated with the positive electrode active substance layer is a positive electrode tab. A lithium-ion battery is used as an example, for which, the positive electrode current collector may be made of aluminum, and the positive electrode active substance layer may be made of lithium cobalt oxide, lithium iron phosphate, ternary lithium, lithium manganate oxide, or the like.

The negative electrode plate may generally include a negative electrode current collector and a negative electrode active substance layer. The negative electrode active substance layer is directly or indirectly coated on the negative electrode current collector. The negative electrode current collector not coated with the negative electrode active substance layer protrudes from the negative electrode current collector coated with the negative electrode active substance layer, and the negative electrode current collector not coated with the negative electrode active substance layer is a negative electrode tab. The negative electrode current collector may be made of copper, and the negative electrode active substance layer may be made of carbon, silicon, or the like.

To ensure that a large current passes through without any fusing, a plurality of positive electrode tabs are provided and stacked together, and a plurality of negative electrode tabs are provided and stacked together. The electrode assembly may be a wound structure or a laminated structure, and the embodiments of the present application are not limited thereto.

The material of the separator is not limited, and may be, for example, polypropylene or polyethylene.

The housing generally includes a housing body and a housing cover. The housing body and the housing cover can be independent components. An opening can be provided on the housing body, and the housing cover can be closed at the opening to form the internal environment of the battery cell, and the electrode assembly, electrolyte solution, and the like are accommodated in this internal environment. The material of the housing body can be various, such as copper, iron, aluminum, stainless steel, aluminum alloy, plastic, and the like, and the material of the housing cover can also be various, such as copper, iron, aluminum, stainless steel, aluminum alloy, plastic, and the like, which are not limited in the embodiments of the present application.

The housing body may be in various shapes and various dimensions, such as a cuboid shape, a cylindrical shape, and a hexagonal prism shape. The shape of the housing body can be determined according to the specific shape and size of the electrode assembly. The housing cover covers the opening of the housing body to isolate the internal environment of the battery cell from the external environment. The shape of the housing cover can be adapted to the shape of the housing body to fit the housing body. Exemplarily, the housing cover can be made of a material with a certain hardness and strength. In this way, the housing cover is not likely to deform when it is squeezed and collided, so that the battery cell can have better structural strength and the reliability can also be improved. Functional components such as electrode terminals can be provided on the housing cover, and the electrode terminals can be used to be electrically connected to the electrode assembly for outputting or inputting the electric energy of the battery cell.

In recent years, new energy vehicles have been developed with a great leap. In the field of electric vehicles, batteries play an irreplaceably important role as a power source of the electric vehicle. As a core component of new energy vehicles, the battery has high requirements for reliability. However, if thermal runaway or internal short circuit occurs during the service of the battery, a large amount of heat and gas will be generated in a short time. When it reaches a certain level, it will affect the reliability of the battery. To improve the reliability of the battery. Therefore, a pressure relief mechanism is generally provided on the housing body or the housing cover of the housing to timely discharge the smoke and pressure generated during the thermal runaway or short circuit of the battery, that is, to release the internal pressure or temperature when the internal pressure or temperature of the battery cell reaches a threshold.

The design of this threshold varies according to different design requirements. For example, the design of this threshold may depend on one or more materials among the positive electrode plate, the negative electrode plate, the electrolyte, and the separator in the battery cell. When the internal pressure or temperature of the battery cell reaches a predetermined threshold, the pressure relief mechanism acts, or the weak structure provided in the pressure relief mechanism is damaged, thereby forming an opening or a passage for releasing the internal pressure or temperature, thus improving the reliability of the battery cell.

The pressure relief valve plate is a commonly used pressure relief mechanism. The pressure relief valve plate can be of a flat plate structure with a thinning recess. The thinning recess on the pressure relief valve plate can thin the local thickness of the pressure relief valve plate as a weak structure, and the depth of the thinning recess is less than the thickness of other areas of the pressure relief valve plate except the thinning recess to achieve the purpose of not penetrating the pressure relief valve plate. In a normal state, the pressure relief valve plate is hermetically combined with the housing, so that the internal environment formed in the housing is sealed and airtight. When the internal pressure or temperature of the battery cell reaches the threshold, the gas in the internal environment expands to make the air pressure in the housing rise beyond the threshold, and the pressure relief valve plate cracks at the thinning recess, so that the inside and outside of the housing are in communication, and the gas in the housing can be released outward through the cracked part of the pressure relief valve plate, thereby improving the reliability of the battery cell.

Generally, the pressure relief valve plate and the housing such as the housing body or the housing cover are processed separately. After the pressure relief valve plate is formed by stamping or other methods, it is connected to the housing by a welding process such as laser welding. During the process of welding the pressure relief valve plate and the housing, the metal material is locally heated and melted to form a molten pool, and then cooled and crystallized. Since when the metal material is locally heated and cooled, a welding tensile stress is formed inside the welding joint, and the tensile stress is transferred to the thinning recess area of the pressure relief valve plate. When the heat input is too large or repeated welding is performed, the excessive welding tensile stress will pull and thin the thinning recess area of the pressure relief valve plate, resulting in a decrease in the pressure resistance value of the pressure relief valve plate, causing the problem of early valve opening during the service of the battery.

Based on the above considerations, in order to solve the problem of early valve opening during the service of the battery, the present application proposes a pressure relief component. The pressure relief component includes a mounting member and a pressure relief valve plate. The mounting member can be a part of the housing such as the housing body or the housing cover, and the mounting member is provided with an opening. A sinking recess is provided around the circumference of the opening of the mounting member. The sinking recess includes a recess bottom wall and a recess side wall. The pressure relief valve plate covers the opening, and the pressure relief valve plate includes a body part and a mounting part. The body part is provided with a weak area, and the mounting part is connected to the periphery of the body part and bent to be supported on the recess bottom wall and welded to the recess side wall.

Therefore, by setting the mounting part of the pressure relief valve plate located in the peripheral area and welded to the recess side wall in a bent form, the mounting part in the bent form can be utilized to eliminate stress in the area of the body part having the weak area close to the welding position, reduce the welding tensile stress transferred to the weak area on the body part, reduce the adverse effect of the welding tensile stress on the weak area on the body part, and improve the problem of early valve opening of the weak area during the service of the pressure relief valve plate. Moreover, since the mounting part in the bent form is supported on the recess bottom wall, the heat generated by welding can be conducted away through the recess bottom wall, thus improving the deformation problem of the pressure relief valve plate caused by welding heat. Also, when welding is performed along the circumferential direction of the pressure relief valve plate, that is, along the contour extension direction of the pressure relief valve plate, the position to be welded in the circumferential direction of the mounting part can be supported by the recess bottom wall, and is not likely to deform under the tensile force of the position being welded and the already welded position in the circumferential direction, thereby reducing the deformation of the pressure relief valve plate in the circumferential direction during the circumferential welding process, improving problems such as edge warping deformation of the pressure relief valve plate during the circumferential welding process, and improving the welding quality, so as to improve the shape uniformity of each position of the pressure relief valve plate in the entire circumferential direction, and further improve the stress uniformity of the pressure relief valve plate during the service process, so that the valve opening timing meets the design requirements and the working stability and reliability of the pressure relief valve plate are improved. In addition, since the mounting part is in a bent form, supported on the recess bottom wall and welded to the recess side wall, the bent structure can be utilized to absorb vibrations and effectively transfer the vibrations to the mounting member, improving problems such as deformation and even fracture of the pressure relief valve plate due to vibrations, thus enhancing the vibration resistance of the pressure relief valve plate and the stability and reliability of the pressure relief valve plate during the service process.

In short, for the pressure relief component proposed in the embodiments of the present application, on the one hand, setting the mounting part on the periphery of the body part in a bent form can eliminate stress through the bent structure, which is beneficial to improve the adverse effect of the welding stress on the weak area of the pressure relief valve plate during the welding process between the pressure relief valve plate and the mounting member, improving the problem of early valve opening, enhancing the accuracy of the valve opening timing of the pressure relief valve plate during its service, and also being beneficial to improve the vibration resistance of the pressure relief valve plate and the stability and reliability of the pressure relief valve plate during its service. On the other hand, supporting the mounting part on the recess bottom wall and welding it to the recess side wall can improve the deformation problem of the pressure relief valve plate during the welding process between the pressure relief valve plate and the mounting member through the support of the recess bottom wall on the mounting part, reducing the occurrence of problems such as edge warping deformation of the mounting part during welding, and improving the welding quality, so as to further improve the stability and reliability of the pressure relief valve plate during its service.

The battery disclosed in the embodiments of the present application may be, but not limited to, used in an electrical apparatus such as a vehicle, a ship, or an aircraft.

Provided in the embodiments of this application is an electric device using a battery as a power source. The electric device may be, but is not limited to, a mobile phone, a tablet computer, a notebook computer, an electric toy, an electric tool, a battery-powered vehicle, an electric vehicle, a ship, a spacecraft, etc. The electric toy may include a stationary or mobile electric toy, such as a game machine, an electric car toy, an electric ship toy, an electric airplane toy, and the like, and the spacecraft may be an airplane, a rocket, a space shuttle, a spaceship, etc.

To facilitate the description, in the following embodiments, as an example for description, an electric device in an embodiment of the present application is a vehicle.

Referring to FIG. 1, FIG. 1 is a schematic diagram of a structure of a vehicle 1000 according to some embodiments of the present application. The vehicle 1000 may be a fuel vehicle, a gas vehicle, or a new energy vehicle, and the new energy vehicle may be a battery electric vehicle, a hybrid vehicle, or a range-extended electric vehicle. Inside the vehicle 1000, a battery 100 is provided, which may be provided at the bottom, head, or tail of the vehicle 1000. The battery 100 may be used to power the vehicle 1000, for example, the battery 100 may be used as an operating power source of the vehicle 1000. The vehicle 1000 may further include a controller 200 and a motor 300, and the controller 200 is used to control the battery 100 to power the motor 300, for example, for a working power requirement for the vehicle 1000 during starting, navigating, and driving the vehicle 1000.

In some embodiments of the present application, the battery 100 may be used not only as the operating power source of the vehicle 1000, but also as a driving power source of the vehicle 1000, instead of or partially instead of fuel or natural gas to provide driving power for the vehicle 1000.

Figure 2:
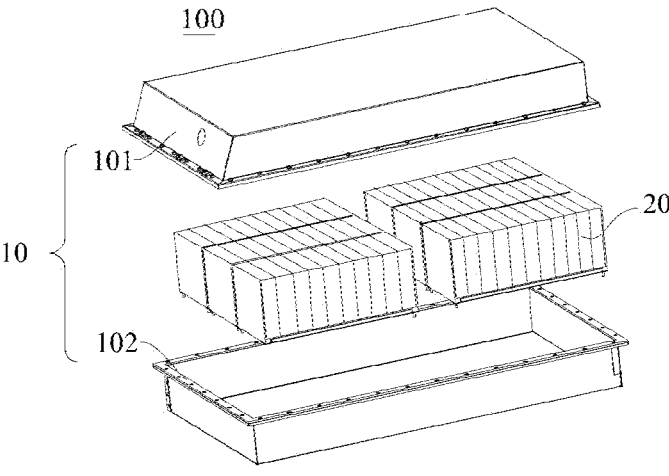
FIG. 2 is an exploded diagram of a structure of a battery according to some embodiments of the present application.

Referring to FIG. 2, FIG. 2 is an exploded view of a structure of a battery 100 provided in some embodiments of the present application. The battery 100 includes a box body 10 and a plurality of battery cells 20, and the battery cells 20 are accommodated in the box body 10. Here, the box body 10 is used for providing assembly space for the battery cell 20, and the box body 10 may have various structures. In some embodiments, the box body 10 may include a first box body 101 and a second box body 102, the first box body 101 and the second box body 102 cover each other, and the first box body 101 and the second box body 102 jointly define the assembly space for accommodating the battery cell 20. The second box body 102 may be of a hollow structure with an opening at one end, the first box body 101 may be of a plate-shaped structure, and the first box body 101 covers an opening side of the second box body 102, so that the first box body 101 and the second box body 102 jointly define the assembly space. Alternatively, the first box body 101 and the second box body 102 each may be of a hollow structure with an opening at one side, and an opening side of the first box body 101 covers an opening side of the second box body 102. Certainly, the box body 10 formed by the first box body 101 and the second box body 102 may be in a plurality of shapes, for example, a cylinder or a cuboid.

In the battery 100, a plurality of battery cells 20 may be connected in series, in parallel, or in a combination of both, and "in a combination of both" means that the plurality of battery cells 20 are connected both in series and in parallel. The plurality of battery cells 20 may be subjected to series connection, parallel connection, or series-parallel connection directly, and then an integration formed by the plurality of battery cells 20 is accommodated in the box body 10. Certainly, the battery 100 may be alternatively a battery module formed by integrating the plurality of battery cells 20 by series connection, parallel connection, or series-parallel connection, and then a plurality of battery modules are integrated by series connection, parallel connection, or series-parallel connection, and accommodated in the box body 10. The battery 100 may further include other structures. For example, the battery 100 may further include a thermal management system for regulating the temperature of the battery cells 20, and a busbar component for achieving electrical connection between the plurality of battery cells 20, and the like.

Referring to FIG. 3, FIG. 3 is a schematic structural diagram of a battery cell 20 provided in some embodiments of the present application. The battery cell 20 may be a secondary battery or a primary battery, or may be a lithium-sulfur battery, a sodium-ion battery, or a magnesium-ion battery, but is not limited thereto. Exemplarily, in FIG. 3, the housing 1 of the battery cell 20 is in the shape of a cuboid, and the housing 1 includes a housing body 11 and a housing cover 12. One end or both ends of the housing body 11 are open, and the housing cover 12 is disposed at the open position. The housing cover 12 is provided with a pressure relief valve plate 2 for releasing the internal pressure or temperature of the housing 1 when the internal pressure or temperature of the battery cell 20 reaches a threshold. However, it is not limited thereto. For example, in other embodiments of the present application, the pressure relief valve plate 2 may also be disposed on the housing body 11. Also, the shape of the housing 1 of the battery cell 20 is not limited thereto. For example, it may also be in the shape of a cylinder, a prism, a flat body, or the like.

Referring to FIG. 4 and FIG. 5, FIG. 4 is a partial sectional view of a pressure relief component 201 provided in some embodiments of the present application, and FIG. 5 is a schematic structural diagram of the pressure relief valve plate 2 shown in FIG. 4. According to some embodiments of the present application, the pressure relief component 201 includes: a mounting member 3 and a pressure relief valve plate 2. The mounting member 3 is not limited in its composition, referring to FIG. 3 and FIG. 4 again, the mounting member 3 may be a part of the housing 1 of the battery cell 20. For example, when the housing 1 is composed of a housing body 11 and a housing cover 12, the mounting member 3 may be the housing body 11 or the housing cover 12. For another example, when the housing 1 is an aluminum-plastic film for a soft package (this example is not shown in the figure), the mounting member 3 may be the aluminum-plastic film.

Referring to FIG. 4 again, the mounting member 3 is provided with an opening 31, where the mounting member 3 is provided with sinking recesses 32 around a circumferential direction of the opening 31, and the sinking recess 32 includes a recess bottom wall 321 and a recess side wall 322. It is worth noting that the "circumferential direction of the opening 31" refers to the contour extension direction of the opening 31. The sinking recess 32 extends along the contour of the opening 31 for the entire circumference. Therefore, the sinking recess 32 is of an annular shape disposed around the opening 31, and the opening 31 is located in the inner ring area of the sinking recess 32. The shape of the sinking recess 32 matches the shape of the opening 31. For example, if the opening 31 is circular, the sinking recess 32 is a circular ring around the circle; for another example, if the opening 31 is elliptical, the sinking recess 32 is an elliptical ring around the ellipse; for yet another example, if the opening 31 is a racetrack shape (also known as an oblong), the sinking recess 32 is a racetrack-shaped ring around the racetrack shape; and for still another example, if the opening 31 is rectangular, the sinking recess 32 is a rectangular ring around the rectangle, and so on.

The sinking recess 32 is recessed along the axial direction of the opening 31. The "axial direction of the opening 31" is the penetration direction of the opening 31, such as the first direction X shown in FIG. 4. One end of the sinking recess 32 in the first direction X is open as the notch 323 of the sinking recess, and the other end of the sinking recess 32 in the first direction X is the recess bottom wall 321. Moreover, the inner end of the sinking recess 32 in the radial direction of the opening 31, that is, the end close to the center of the opening 31, is open, and the outer end of the sinking recess 32 in the radial direction of the opening 31, that is, the end far from the center of the opening 31, is the recess side wall 322. The "radial direction of the opening 31" is the connecting line direction between the center of the opening 31 and any point on the contour of the opening 31. Since there are countless points on the contour, there are countless radial directions of the opening 31. For example, in the cross-section shown in FIG. 4, the radial direction of the opening 31 is the second direction Y.

Referring to FIG. 4 and FIG. 5 again, the pressure relief valve plate 2 covers the opening 31. The pressure relief valve plate 2 includes a body part 21 and a mounting part 22. The body part 21 is provided with a weak area 211. The specific form of the weak area 211 is not limited. For example, the body part 21 is locally provided with a thinning recess 23. The body part 21 is weaker at the thinning recess 23 than at other parts. For another example, the local material strength of the body part 21 is less than the material strength of other parts of the body part 21, so the part with weaker material strength is relatively weak, and the like. These relatively weak parts can all serve as the weak area 211.

Referring to FIG. 4 and FIG. 5 again, the mounting part 22 is connected to the periphery of the body part 21. The mounting part 22 is bent to be supported on the recess bottom wall 321 and welded to the recess side wall 322. The mounting part 22 is connected to the position of the body part 21 away from the center of the pressure relief valve plate 2. When the pressure relief valve plate 2 covers the opening 31, the mounting part 22 located on the periphery of the body part 21 can be matched with the sinking recess 32 on the periphery of the opening 31. At the same time, the weak area 211 on the body part 21 located on the inner periphery of the mounting part 22 corresponds to the opening 31.

Combining FIG. 3 and FIG. 4, when the pressure in the housing 1 of the battery cell 20 increases, it can be transferred to the weak area 211 through the opening 31, causing the weak area 211 to rupture and achieve pressure relief. Exemplarily, when making an orthographic projection along the axial direction of the opening 31, such as the first direction X shown in FIG. 4, the orthographic projection of the body part 21 completely or almost completely falls within the orthographic projection range of the opening 31, thereby improving the reliability of pressure relief of the weak area 211.

In some embodiments of the present application, at least part of the mounting part 22 is in a non-flat bent shape, but the specific bending position and bending shape are not limited. For example, it may be bent once or multiple times, etc., and is not limited to the shape shown in FIG. 5. In addition, the end of the mounting part 22 for connecting to the body part 21 may be in a bent shape or a flat shape. That is, from the edge of the body part 21 toward the direction away from the body part 21, the mounting part 22 may be directly inclined relative to the body part 21 to achieve bending. Alternatively, from the edge of the body part 21 toward the direction away from the body part 21, the mounting part 22 may first extend along the extension direction of the body part 21 for a certain distance, and then be inclined relative to the extension direction of the body part 21 to achieve bending. There is no limitation here.

In the above technical solution of the present application, by setting the mounting part 22 of the pressure relief valve plate 2 located in the peripheral area and welded to the recess side wall 322 in a bent form, the mounting part in the bent form 22 can be utilized to reduce the welding tensile stress transferred to the weak area 211 on the body part 21 in the area of the body part 21 having the weak area 211 close to the welding position, reduce the adverse effect of the welding tensile stress on the weak area 211 on the body part 21, and improve the problem of early valve opening of the weak area 211 during the service of the pressure relief valve plate 2.

Moreover, since the mounting part in the bent form 22 is supported on the recess bottom wall 321 and welded to the recess side wall 322, the heat generated by welding can be conducted away through the recess bottom wall 321, thus improving the deformation problem of the pressure relief valve plate 2 caused by welding heat. Also, when welding is performed along the circumferential direction of the pressure relief valve plate 2, that is, along the contour extension direction of the pressure relief valve plate 2, the position to be welded in the circumferential direction of the mounting part 22 can be supported by the recess bottom wall 321, and is not likely to deform under the tensile force of the position being welded and the already welded position in the circumferential direction, thereby reducing the deformation of the pressure relief valve plate 2 in the circumferential direction during the circumferential welding process, improving problems such as edge warping deformation of the pressure relief valve plate 2 during the circumferential welding process, and improving the welding quality, so as to improve the shape uniformity of each position of the pressure relief valve plate 2 in the entire circumferential direction, and further improve the stress uniformity of the pressure relief valve plate 2 during the service process, so that the valve opening timing meets the design requirements and the working stability and reliability of the pressure relief valve plate 2 are improved.

In addition, since the mounting part 22 is in a bent form, supported on the recess bottom wall 321 and welded to the recess side wall 322, the bent structure can be utilized to absorb vibrations and effectively transfer the vibrations to the mounting member 3, improving problems such as deformation and even fracture of the pressure relief valve plate 2 due to vibrations, thus enhancing the vibration resistance of the pressure relief valve plate 2 and the stability and reliability of the pressure relief valve plate 2 during the service process.

In short, the pressure relief component 201 proposed in the embodiments of the present application is beneficial to improve the adverse effect of the welding stress on the weak area 211 of the pressure relief valve plate 2 during the welding process between the pressure relief valve plate 2 and the mounting member 3, improving the problem of early valve opening, and is beneficial to improve problems such as welding edge warping deformation, improving the welding quality, enhancing the accuracy of the valve opening timing of the pressure relief valve plate 2 during its service, and is also beneficial to improve the vibration resistance of the pressure relief valve plate 2 and the stability and reliability of the pressure relief valve plate 2 during its service.

Therefore, according to the pressure relief component 201 of the embodiments of the present application, on the one hand, setting the mounting part 22 on the periphery of the body part 21 in a bent form can eliminate stress through the bent structure, which is beneficial to improve the adverse effect of the welding stress on the weak area 211 of the pressure relief valve plate 2 during the welding process between the pressure relief valve plate 2 and the mounting member 3, improving the problem of early valve opening, enhancing the accuracy of the valve opening timing of the pressure relief valve plate 2 during its service, and also being beneficial to improve the vibration resistance of the pressure relief valve plate 2 and the stability and reliability of the pressure relief valve plate 2 during its service. On the other hand, supporting the mounting part 22 on the recess bottom wall 321 and welding it to the recess side wall 322 can improve the deformation problem of the pressure relief valve plate 2 during the welding process between the pressure relief valve plate 2 and the mounting member 3 through the support of the recess bottom wall 321 on the mounting part 22, reducing the occurrence of problems such as edge warping deformation of the mounting part 22 during welding, and improving the welding quality, so as to further improve the stability and reliability of the pressure relief valve plate 2 during its service.

According to some embodiments of the present application, referring to FIG. 4 and FIG. 5 again, the mounting part 22 includes a cantilever section 221, a connecting section 222 and a welding section 223 sequentially connected from inside to outside in a radial direction of the opening 31, the connecting section 222 is supported on the recess bottom wall 321, the cantilever section 221 is suspended above the opening 31 and/or the sinking recess 32, and the cantilever section 221 and the welding section 223 are both bent toward a notch 323 of the sinking recess relative to the connecting section 222, so that a clearance recess 224 is formed among the cantilever section 221, the connecting section 222 and the welding section 223, and the welding section 223 is welded to the recess side wall 322.

It is worth noting that the "bent" described in the present application only represents the shape, rather than limiting the process. Moreover, "both the cantilever section 221 and the welding section 223 are bent toward the notch 323 of the sinking recess relative to the connecting section 222" means that both the cantilever section 221 and the welding section 223 extend toward the notch 323 of the sinking recess relative to the connecting section 222, making the mounting part 22 in a bent shape, rather than the cantilever section 221 itself being in a bent shape and the welding section 223 itself being in a bent shape. Certainly, in other embodiments of the present application, at least one of the cantilever section 221 and the welding section 223 can be set in a bent form as needed.

"The cantilever section 221 is suspended above the opening 31 and/or the sinking recess 32" means that when making an orthographic projection along the axial direction of the opening 31, for example, the first direction X shown in FIG. 4, the orthographic projection of the cantilever section 221 falls on the opening 31 and/or the sinking recess 32, and the cantilever section 221 has no contact with the opening 31 and the sinking recess 32, being in a suspended state.

The mounting part 22 is located on the periphery of the body part 21 and plays the role of connecting the pressure relief valve plate 2 and the mounting member 3. The mounting part 22 includes the bent part composed of the above cantilever section 221, connecting section 222 and welding section 223. When the welding section 223 is welded to the recess side wall 322, since the side of the welding section 223 facing away from the recess side wall 322 is the clearance recess 224, the welding section 223 can release the welding tensile stress through gradual melting and/or micro-deformation, thereby improving the adverse effect of the welding tensile stress on the weak area 211. Moreover, since the side of the welding section 223 facing away from the clearance recess 224 is welded to the recess side wall 322, the welding tensile stress is not directly transferred to the body part 21 along the radial direction of the opening 31, such as the second direction Y shown in FIG. 4. Instead, a part of the stress is transferred to the clearance recess 224 and can be released, thus reducing the adverse effect of the welding tensile stress on the weak area 211.

Also, since the suspended cantilever section 221 is located between the weak area 211 and the clearance recess 224, it can balance and absorb the stress and vibration during the welding and service of the pressure relief valve plate 2, reducing the adverse effect of the force on the weak area 211. Also, during the service of the pressure relief valve plate 2, the cantilever section 221 can balance the overall stress distribution of the pressure relief valve plate 2 through micro-deformation, making the stress on the pressure relief valve plate 2 more uniform, improving the problem of uneven local deformation of the pressure relief valve plate 2 during its service, and further enhancing the fatigue resistance of the pressure relief valve plate 2 during its service, as well as improving the service reliability and service stability of the pressure relief valve plate 2. Also, during the long-term service of the pressure relief valve plate 2, the cantilever section 221 can release the local stress concentration on the pressure relief valve plate 2 caused by the internal gas generation or vibration of the battery 100 through micro-deformation, thereby improving the long-term service stability and vibration resistance of the pressure relief valve plate 2.

In addition, since the connecting section 222 that defines the clearance recess 224 is supported on the recess bottom wall 321, the mounting part 22 can be stably supported on the recess bottom wall 321, which, on the one hand, can improve the convenience and stability of assembling the mounting part 22 to the sinking recess 32, and on the other hand, can effectively improve problems such as edge warping deformation of the pressure relief valve plate 2 during the circumferential welding process of the pressure relief valve plate 2, improve the welding quality, and enhance the uniformity of the stress on the pressure relief valve plate 2, thereby facilitating the improvement of the service stability and reliability of the pressure relief valve plate 2.

Exemplarily, when hot-melt welding such as laser welding is adopted, the welding section 223 and the mounting member 3 are heated, melted, and solidified into one piece during welding. On the one hand, since the welding section 223 participates in the melting and solidification, the thermal stress of the welding section 223 is effectively released, improving the adverse effect of the welding tensile stress on the weak area 211. On the other hand, since the side of the welding section 223 close to the body part 21 is the clearance recess 224 after the welding section 223 is melted, there is no metallic substance for blocking, and the molten pool metal spreads into the clearance recess 224 under the action of its own weight, improving the good fluidity of the molten pool and enhancing the welding quality. It is worth noting that the clearance recess 224 can still exist after welding. In addition, it should be noted that the welding between the pressure relief valve plate 2 and the mounting member 3 in the embodiments of the present application is not limited to laser welding. For example, it can also be plasma welding, electron beam welding, brazing, pressure welding, or the like.

As described above, by providing the clearance recess 224 and the cantilever section 221 on the pressure relief valve plate 2, the welding section 223 on the side of the clearance recess 224 away from the weak area 211 is welded to the recess side wall 322, and the connecting section 222 on the side of the clearance recess 224 facing the recess bottom wall 321 is supported on the recess bottom wall 321, which can effectively release the welding stress generated during the welding of the pressure relief valve plate 2 and the mounting member 3, reduce the welding stress transferred to the weak area 211, effectively reduce the adverse effect of the welding stress on the weak area 211, improve the welding quality between the pressure relief valve plate 2 and the mounting member 3, and improve the quality stability after welding and the service reliability of the pressure relief valve plate 2. Also, the cantilever section 221 can balance the overall stress distribution of the pressure relief valve plate 2 through micro-deformation during the long-term service of the pressure relief valve plate 2. For example, the cantilever section 221 can release the local stress concentration phenomenon caused by the internal gas generation or vibration of the battery 100 on the pressure relief valve plate 2 through micro-deformation, making the stress on the pressure relief valve plate 2 more uniform, improving the problem of uneven local deformation of the pressure relief valve plate 2 during its service, and further improving the fatigue resistance and vibration resistance of the pressure relief valve plate 2 during its service, enhancing the service reliability and service stability of the pressure relief valve plate 2. At the same time, the structure of the clearance recess 224 can increase the spread ability of the welding molten pool and improve the welding quality.

In short, setting the mounting part 22 in the above structural form can effectively improve the adverse effect of the welding stress on the weak area 211 of the pressure relief valve plate 2, and improve the stress distribution of the pressure relief valve plate 2 during its service, so that the stress is more uniform, the vibration resistance and fatigue resistance of the pressure relief valve plate 2 are improved, and the service reliability and stability of the pressure relief valve plate 2 are further improved. In addition, the mounting part 22 in the above structural form is simple in structure and easy to process.

Figure 6:
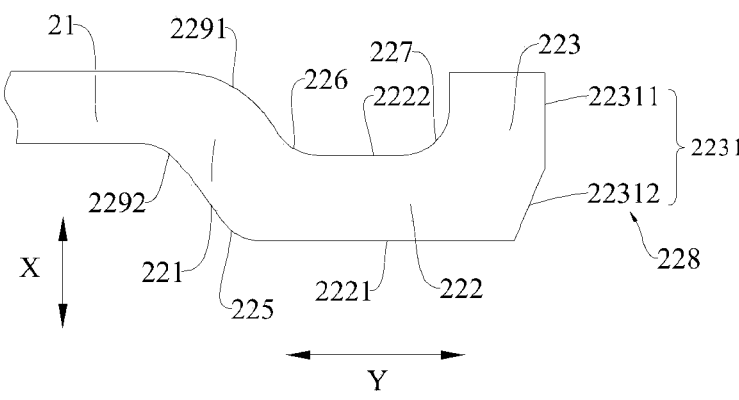
FIG. 6 is a partial enlarged view of the pressure relief valve plate shown in FIG. 5.

Referring to FIG. 4 and FIG. 5 again, and in combination with FIG. 6, FIG. 6 is a partial enlarged view of the pressure relief valve plate 2 shown in FIG. 5. In some embodiments of the present application, one surface of the connecting section 222 facing the recess bottom wall 321 includes a first planar section 2221. The first planar section 2221 is disposed parallel or substantially parallel to the recess bottom wall 321, so that the first planar section 2221 is in surface contact and support fit with the recess bottom wall 321. Therefore, by supporting the recess bottom wall 321 with the first planar section 2221, the effect of surface contact and fit between the two is achieved instead of line contact or point contact, which can increase the contact area between the connecting section 222 and the recess bottom wall 321, improve the stability of the contact and support fit, and is beneficial to better improve the deformation problem of the pressure relief valve plate 2 caused by the welding tensile stress during welding along the circumferential direction of the pressure relief valve plate 2. Also, during welding, the welding heat can be conducted away from the recess bottom wall 321 to a greater extent, which is beneficial to better reduce the deformation problem of the pressure relief valve plate 2 caused by the welding thermal stress. Also, the vibration received by the pressure relief valve plate 2 during its service can also be transferred to the recess bottom wall 321 to a greater extent, so as to improve the damage problem of the pressure relief valve plate 2 caused by the vibration.

In some embodiments of the present application, the first planar section 2221 is an annular plane surrounding the entire circumference of the body part 21. Therefore, by setting the first planar section 2221 in the form of a continuously extending full circumference, the mounting part 22 can be stably supported on the recess bottom wall 321 at any position in the entire circumferential direction, which is beneficial to further increase the contact area of the surface contact and fit between the mounting part 22 and the recess bottom wall 321, improving the stability of the support and fit, further increasing the contact area of heat transfer between the mounting part 22 and the recess bottom wall 321, better improving the deformation problem of the pressure relief valve plate 2 caused by the thermal stress, and further increasing the vibration transferred from the pressure relief valve plate 2 to the recess bottom wall 321, so as to better protect the pressure relief valve plate 2. Certainly, the present application is not limited thereto. For example, in other embodiments of the present application, the first planar section 2221 can also be set to be intermittently disposed along the ring shape, or the first planar section 2221 can be set to be in an open annular structure, and the like.

In some embodiments of the present application, referring to FIG. 4-FIG. 6 again, a side surface of the connecting section 222 away from the recess bottom wall 321 includes a second planar section 2222, and at least a part of a projection of the second planar section 2222 on the first planar section 2221 along the axial direction of the opening 31 (for example, the first direction X shown in FIG. 6) falls within the first planar section 2221. Therefore, the connecting section 222 is easy to be processed and formed, so that the wall thickness of the connecting section 222 has a relatively uniform wall thickness, a stable shape, and good stress stability. Also, it is beneficial to obtain a larger first planar section 2221, so as to further improve the stability of the contact and support fit between the mounting part 22 and the recess bottom wall 321, and further increase the contact area of heat transfer and vibration transfer between the mounting part 22 and the recess bottom wall 321.

Figure 7:
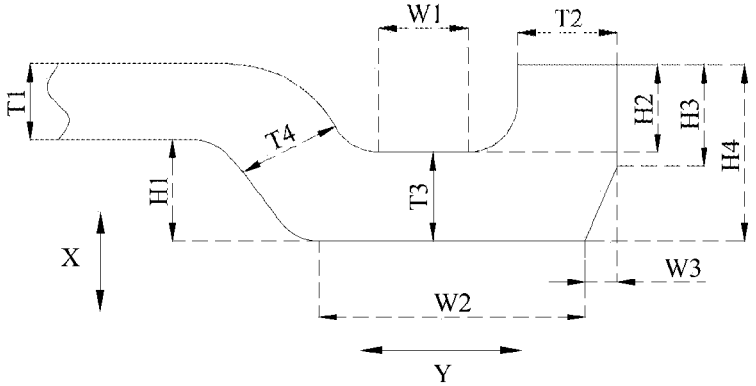
FIG. 7 is a parameter identification diagram of a partial structure of the pressure relief valve plate shown in FIG. 6.

Referring to FIG. 6 again and in combination with FIG. 7, FIG. 7 is a parameter identification diagram of a partial structure of the pressure relief valve plate 2 shown in FIG. 6. In some embodiments of the present application, a radial width W1 of the second planar section 2222 is less than a radial width W2 of the first planar section 2221. It is worth noting that the "radial width" described in the present application refers to the width in the radial direction of the opening 31, for example, the second direction Y shown in FIG. 6. As described above, there are countless radial directions of the opening 31. Therefore, the values of the radial width W1 in various radial directions can be the same or different, and the values of the radial width W2 in various radial directions can be the same or different. However, regardless of the specific values, it should be satisfied that the radial width W1 is smaller than the radial width W2 in the same radial direction.

Thus, the radial width of the first planar section 2221 is relatively large, which can achieve a more effective surface contact effect with the recess bottom wall 321, and is beneficial to further improve the stability of the contact and support fit between the mounting part 22 and the recess bottom wall 321, and further increasing the contact area of heat transfer and vibration transfer between the mounting part 22 and the recess bottom wall 321.

Referring to FIG. 6 and FIG. 7 again, in some embodiments of the present application, the radial width W2 of the first planar section 2221 is 0.5-8 times the wall thickness T1 of the body part 21, such as 0.5, 1, 2, 3, 4, 5, 6, 7, 8 times, etc., and the radial width W1 of the second planar section 2222 is 0.1-5 times the wall thickness T1 of the body part 21, such as 0.1, 0.5, 2, 2.5, 3, 3.5, 4, 4.5, 5 times, etc. It is worth noting that the body part 21 in the embodiments of the present application can be of an equal-thickness structure or an unequal-thickness structure. When the body part 21 is of an equal-thickness structure, the wall thickness of other positions of the body part 21 except the weak area 211 is a fixed value, and the value is the wall thickness T1. When the body part 21 is of a non-equal-thickness structure, the average wall thickness of other positions of the body part 21 except the weak area 211 is the wall thickness T1.

Therefore, by setting W1 to be greater than or equal to 0.1T1 and less than or equal to 5T1, and setting W2 to be greater than or equal to 0.5T1 and less than or equal to 8T1, the mounting part 22 is easy to be processed and formed, so that the wall thickness of the connecting section 222 has a relatively uniform wall thickness, a stable shape, and good stress stability. Also, it is beneficial to obtain a larger first planar section 2221, so as to further improve the stability of the contact and support fit between the mounting part 22 and the recess bottom wall 321, and further increase the contact area of heat transfer and vibration transfer between the mounting part 22 and the recess bottom wall 321.

Referring to FIG. 6 and FIG. 7 again, in some embodiments of the present application, the radial width W1 of the second planar section 2222 is smaller than the radial width W2 of the first planar section 2221. At the same time, the radial width W2 of the first planar section 2221 is 0.5-8 times the wall thickness T1 of the body part 21, and the radial width W1 of the second planar section 2222 is 0.1-5 times the wall thickness T1 of the body part 21. That is, when W1 is selected from 0.1T1-5T1 and W2 is selected from 0.5T1-8T1, W1<W2 should be satisfied at the same time, which makes it convenient for the processing and forming of the mounting part 22, so that the wall thickness of the connecting section 222 is relatively uniform, the shape is stable, and the stress stability is relatively good. Also, the area of the first planar section 2221 is larger, which can achieve a more effective surface contact effect with the recess bottom wall 321, thereby further improving the stability of the contact and support fit between the mounting part 22 and the recess bottom wall 321, and further improving the contact area of heat transfer and vibration transfer between the mounting part 22 and the recess bottom wall 321.

Exemplarily, the value range of W1 can be 0.3 mm-1 mm. For example, W1 can be 0.3 mm, 0.4 mm, 0.5 mm, 0.6 mm, 0.7 mm, 0.8 mm, 0.9 mm, 1 mm, etc. The value range of W2 can be 1 mm-1.5 mm. For example, W2 can be 1 mm, 1.1 mm, 1.2 mm, 1.3 mm, 1.4 mm, 1.5 mm, etc. This makes it convenient for the processing and forming of the mounting part 22, so that the wall thickness of the connecting section 222 is relatively uniform, the shape is stable, and the stress stability is relatively good. Moreover, the area of the first planar section 2221 is larger, which can achieve a more effective surface contact effect with the recess bottom wall 321, thereby further improving the stability of the contact and support fit between the mounting part 22 and the recess bottom wall 321, and further improving the contact area of heat transfer and vibration transfer between the mounting part 22 and the recess bottom wall 321.

Referring to FIG. 6 and FIG. 7 again, in some embodiments of the present application, the size of the mounting part 22 satisfies condition one. The condition one is that the wall thickness T3 of the connecting section 222 is 0.75-1.2 times the wall thickness T1 of the body part 21, such as 0.75, 0.85, 0.95, 1, 1.05, 1.1, 1.15, or 1.2 times, etc. It is worth noting that the connecting section 222 can have an equal wall thickness structure or an unequal wall thickness structure. When it has an equal wall thickness structure, the wall thickness of the connecting section 222 is a fixed value, and the value is the wall thickness T3. When it has an unequal wall thickness structure, the average wall thickness of the connecting section 222 is the wall thickness T3.

Therefore, by setting T3 to be greater than or equal to 0.75T1 and less than or equal to 1.2T1, the thickness of the connecting section 222 is not too thin, improving the reliability of the supporting contact with the recess bottom wall 321, and the thickness of the connecting section 222 is not too thick, which is beneficial to leave a sufficient depth for the clearance recess 224, so that the clearance recess 224 can effectively play the role of releasing tensile stress.

Exemplarily, the value range of T3 can be 0.4 mm-0.6 mm. For example, T3 can be 0.4 mm, 0.45 mm, 0.5 mm, 0.55 mm, 0.6 mm, etc. This makes the thickness of the connecting section 222 not too thin, which improves the reliability of the supporting contact with the recess bottom wall 321, and the thickness of the connecting section 222 is not too thick, which is beneficial to leave a sufficient depth for the clearance recess 224, so that the clearance recess 224 can effectively play the role of releasing tensile stress.

Referring to FIG. 6 and FIG. 7 again, in some embodiments of the present application, the size of the mounting part 22 satisfies condition two. The condition two is that the axial depth H2 of the clearance recess 224 is 0.5-3 times the wall thickness T1 of the body part 21, such as 0.5, 1, 1.5, 2, 2.5, or 3 times, etc. It is worth noting that the "axial depth of the clearance recess 224" refers to the maximum depth in the axial direction of the opening 31 (for example, the first direction X shown in FIG. 6).

Therefore, by setting H2 to be greater than or equal to 0.5T1 and less than or equal to 3T1, the depth of the clearance recess 224 makes it have good processability, the shape of the processed clearance recess 224 is relatively stable and reliable, and the depth of the clearance recess 224 is not too shallow, so that the clearance recess 224 can effectively play the role of releasing tensile stress, and the depth of the clearance recess 224 is not too deep, which is beneficial to leave a sufficient wall thickness for the connecting section 222 and improving the reliability of the supporting contact between the connecting section 222 and the recess bottom wall 321.

In addition, in some embodiments of the present application, the size of the mounting part 22 can satisfy both the above condition one and condition two. Thus, the depth of the clearance recess 224 makes it have good processability, the shape of the processed clearance recess 224 is relatively stable and reliable, and the clearance recess 224 can effectively play the role of releasing tensile stress, and the supporting contact between the connecting section 222 and the recess bottom wall 321 is more reliable.

Referring to FIG. 5 again, in some embodiments of the present application, a projection of the weak area 211 on the mounting part 22 along the radial direction of the opening 31 (for example, the second direction Y shown in FIG. 5) falls within the clearance recess 224. For example, when the weak area 211 is in the form of a thinning recess, the orthographic projection of the thinning recess along the radial direction of the opening 31 falls within the clearance recess 224. Therefore, when the welding stress between the welding section 223 and the recess side wall 322 is transferred toward the weak area 211 along the radial direction of the opening 31, since the setting position of the clearance recess 224 can make at least part of the force transfer path along the radial direction missing, the welding stress transferred toward the weak area 211 can be released, and the adverse effect of the welding stress on the weak area 211 can be more effectively improved.

Referring to FIG. 5 again, in some embodiments of the present application, a projection of the body part 21 on the mounting part 22 along the radial direction of the opening 31 (for example, the second direction Y shown in FIG. 5) entirely falls within the clearance recess 224. Therefore, when the welding stress between the welding section 223 and the recess side wall 322 is transferred toward the weak area 211 along the radial direction of the opening 31, since the setting position of the clearance recess 224 can make the force transfer path along the radial direction interrupted at the clearance recess 224, so as to more fully release the welding stress transferred toward the weak area 211, thereby more effectively improving the adverse effect of the welding stress on the weak area 211.

In some embodiments of the present application, referring to FIG. 5 and FIG. 6 again, the connecting section 222 is connected to at least one of the cantilever section 221 and the welding section 223 through a chamfer or a fillet. Therefore, the problem of stress concentration caused by the transition of a large bending angle at the connection can be improved, and the structural reliability of the pressure relief valve plate 2 can be enhanced. When the pressure relief valve plate 2 is welded or subjected to stress during its service, problems such as fracture are not likely to occur.

For example, the chamfer can include at least one of the first chamfer 225, the second chamfer 226, the third chamfer 227 and the fourth chamfer 228. The surface of the connecting section 222 facing the recess bottom wall 321 and the corresponding surface of the cantilever section 221 can be connected through the first chamfer 225. The surface of the connecting section 222 away from the recess bottom wall 321 and the corresponding surface of the cantilever section 221 can be connected through the second chamfer 226. The surface of the connecting section 222 away from the recess bottom wall 321 and the corresponding surface of the welding section 223 can be connected through the third chamfer 227. The surface of the connecting section 222 facing the recess bottom wall 321 and the corresponding surface of the welding section 223 can be connected through the fourth chamfer 228.

Exemplarily, the third chamfer 227 can be a fillet, and the chamfer radius R1 can be 0.2 mm-1 mm. For example, R1 can be 0.2 mm, 0.3 mm, 0.4 mm, 0.5 mm, 0.6 mm, 0.7 mm, 0.8 mm, 0.9 mm, 1 mm, etc. Therefore, when welding stress is generated during the welding of the welding section 223 and the recess side wall 322, the problem of stress concentration at the connection between the connecting section 222 and the welding section 223 can be improved, and the risk of fracture at the connection between the connecting section 222 and the welding section 223 can be reduced, so that the welding stress can be effectively released through the microdeformation of the mounting part 22. In addition, exemplarily, the second chamfer 226 and the first chamfer 225 can also be fillets, and the chamfer radius can be equal to or close to the chamfer radius R1, which is easy to design and process, and the effect of improving the stress concentration problem at the corresponding connection is relatively reliable.

In some embodiments of the present application, referring to FIG. 6 and FIG. 7 again, one end of the cantilever section 221 away from the connecting section 222 is bent and connected to the edge of the body part 21 (that is, a bend is formed at the connection position between the cantilever section 221 and the body part 21 of the pressure relief valve plate 2), so that the cantilever section 221 is inclined relative to the body part 21. For example, the cantilever section 221 extends obliquely relative to the body part 21 along a direction from the body part 21 to the connecting section 222. Therefore, it can be seen that the cantilever section 221 is directly connected to the body part 21 instead of indirectly connected. Also, by setting the cantilever section 221 to extend obliquely relative to the body part 21 along the direction from the body part 21 to the connecting part, the cantilever section 221 can be suspended relative to the opening 31 and/or the sinking recess 32. In this way, the body part 21 is only composed of the cantilever section 221, the connecting section 222 and the welding section 223, which has a simple structure, occupies a small space and is easy to process.

Certainly, the present application is not limited thereto. For example, in other embodiments of the present application, other structures can be connected between the body part 21 and the cantilever section 221, that is, the mounting part 22 can also include a transition section, so that the cantilever section 221 is indirectly connected to the body part 21. For example, the transition section can extend along a straight line, an oblique line, a curve, a broken line, or the like. When the transition section is in a bent shape, the internal stress or external force transferred from the mounting part 22 to the body part 21 can be further reduced, and the adverse effect on the weak area 211 of the body part 21 can be further reduced. For example, in the radial direction of the opening 31, the mounting part 22 can extend along a linear shape of an approximate "U" shape, "V" shape, "W" shape, "M" shape, "N" shape, or the like along the direction away from the body part 21.

Exemplarily, referring to FIG. 6 and FIG. 7 again, when one end of the cantilever section 221 away from the connecting section 222 is connected to the edge of the body part 21, the axial height difference H1 between the surface of the body part 21 on the side of the thickness close to the recess bottom wall 321 and the first planar section 2221 is 0.5-2 times the wall thickness T1 of the body part 21, such as 0.5, 0.75, 1, 1.25, 1.5, 1.75, 2 times, etc. It is worth noting that the "axial height difference H1" refers to the average value of the height difference in the axial direction of the opening 31 (for example, the first direction X shown in FIG. 6). For example, the lower surface of the body part 21 and the lower surface of the connecting section 222 shown in FIG. 7 are both horizontal planes, and the height difference between these two horizontal planes in the up-down direction is the axial height difference H1.

Therefore, by setting H1 to be greater than or equal to 0.5T1 and less than or equal to 2T1, the extension distance of the cantilever section 221 in the axial direction of the opening 31 may not be too short, so that the opening position and depth of the clearance recess 224 can easily release the welding stress, and the connecting section 222 can have a certain thickness to ensure reliable contact and support with the recess bottom wall 321. Also, the extension distance of the cantilever section 221 in the axial direction of the opening 31 may not be too long, which is beneficial to reduce the space occupied by the pressure relief valve plate 2 in the axial direction of the opening 31, improving the structural compactness of the battery cell 20 and increasing the energy density of the battery cell 20 per unit volume.

Exemplarily, the value range of H1 can be 0.3 mm-1 mm. For example, H1 can be 0.3 mm, 0.4 mm, 0.5 mm, 0.6 mm, 0.7 mm, 0.8 mm, 0.9 mm, 1 mm, etc. Thus, the extension distance of the cantilever section 221 in the axial direction of the opening 31 may not be too short, so that the opening position and depth of the clearance recess 224 can easily release the welding stress, and the connecting section 222 can have a certain thickness to ensure reliable contact and support with the recess bottom wall 321. Also, the extension distance of the cantilever section 221 in the axial direction of the opening 31 may not be too long, which is beneficial to reduce the space occupied by the pressure relief valve plate 2 in the axial direction of the opening 31, improving the structural compactness of the battery cell 20 and increasing the energy density of the battery cell 20 per unit volume.

Exemplarily, referring to FIG. 6 and FIG. 7 again, when one end of the cantilever section 221 away from the connecting section 222 is connected to the edge of the body part 21, the wall thickness T4 of the cantilever section 221 is greater than or equal to the wall thickness T1 of the body part 21. It is worth noting that the cantilever section 221 can have an equal wall thickness structure or an unequal wall thickness structure. When it has an equal wall thickness structure, the wall thickness of the cantilever section 221 is a fixed value, and the value is the wall thickness T4. When it has an unequal wall thickness structure, the average wall thickness of the cantilever section 221 is the wall thickness T4.

Therefore, by setting the wall thickness T4 of the cantilever section 221 to be greater than or equal to the wall thickness T1 of the body part 21, the wall thickness of the cantilever section 221 is relatively large, which can more effectively balance the overall stress on the pressure relief valve plate 2 during welding and service, and better play the role of releasing stress and buffering vibration, so as to better protect the weak area 211 from the influence of welding stress and improve the service stability and reliability of the pressure relief valve plate 2.

Exemplarily, referring to FIG. 6 and FIG. 7 again, the wall thickness T4 of the cantilever section 221 is 1.1-1.8 times the wall thickness T1 of the body part 21, such as 1.1, 1.2, 1.3, 1.4, 1.5, 1.6, 1.7, 1.8 times, etc. Therefore, by setting T4 to be greater than or equal to 1.1T1 and less than or equal to 1.8T1, the difference in wall thickness between the cantilever section 221 and the body part 21 is not too large, which improves the processability of the pressure relief valve plate 2, and the wall thickness of the cantilever section 221 can meet the requirement of being greater than the wall thickness of the body part 21, so that the cantilever section 221 can effectively balance the overall stress on the pressure relief valve plate 2 during welding and service, and effectively play the role of releasing stress and buffering vibration, so as to better protect the weak area 211 from the influence of welding stress and improve the service stability and reliability of the pressure relief valve plate 2.

Exemplarily, the value range of T1 can be 0.3 mm-0.4 mm, and the value range of T4 can be 0.4 mm-1 mm. For example, T4 can be 0.4 mm, 0.5 mm, 0.6 mm, 0.7 mm, 0.8 mm, 0.9 mm, 1 mm, etc. This is beneficial to improve the processability of the pressure relief valve plate 2, and the cantilever section 221 can effectively balance the overall stress on the pressure relief valve plate 2 during welding and service, and effectively play the role of releasing stress and buffering vibration, so as to better protect the weak area 211 from the influence of welding stress and improve the service stability and reliability of the pressure relief valve plate 2.

Certainly, the present application is not limited thereto, and according to different specifications of the battery cell 20, the value range of T1 may be further extended to 0.3 mm-2 mm, or even larger, so that the size of the mounting part 22 may be adjusted accordingly according to T1, which is not repeated here.

In some embodiments of the present application, referring to FIG. 4-FIG. 6 again, the body part 21 and the cantilever section 221 are connected by a chamfer or a fillet. Therefore, the problem of stress concentration caused by the transition of a large bending angle at the connection can be improved, and the reliability of the cantilever section 221 to absorb stress or vibration can be enhanced. When the pressure relief valve plate 2 is welded or subjected to stress during service, the problem such as breakage at the connection between the body part 21 and the cantilever section 221 is not easy to occur, the connection reliability between the mounting part 22 and the body part 21 is improved, so that the cantilever section 221 can effectively play a role of releasing stress and buffering vibration, and the effect of the cantilever section 221 to balance the overall stress on the pressure relief valve plate 2 during welding and service is enhanced.

For example, the chamfer can include the fifth chamfer 2291 and/or the sixth chamfer 2292. The surface of the body part 21 on the thickness side (for example, the side surface away from the connecting section 222) and the corresponding side surface of the cantilever section 221 can be connected through the fifth chamfer 2291. The surface of the body part 21 on the other thickness side (for example, the side surface close to the connecting section 222) and the corresponding side surface of the cantilever section 221 can be connected through the sixth chamfer 2292.

Exemplarily, the fifth chamfer 2291 can be a fillet, and the chamfer radius R2 can be 0.2 mm-2 mm. For example, R2 can be 0.2 mm, 0.3 mm, 0.4 mm, 0.5 mm, 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2 mm, etc. This can improve the processing quality of the connection between the mounting part 22 and the cantilever section 221, effectively improve the problem of stress concentration at the connection between the cantilever section 221 and the body part 21, improve the connection reliability between the mounting part 22 and the body part 21, enable the cantilever section 221 to more effectively play the role of releasing stress and buffering vibration, and enhance the effect of the cantilever section 221 to balance the overall stress on the pressure relief valve plate 2 during welding and service.

Exemplarily, the sixth chamfer 2292 can be a fillet, and the chamfer radius is smaller than the chamfer radius R2. This is convenient to achieve the effect of increasing the wall thickness when transitioning from the body part 21 to the cantilever section 221, that is, it is easy to make the wall thickness T4 of the cantilever section 221 greater than or equal to the wall thickness T1 of the body part 21. Therefore, the processing quality of the connection between the mounting part 22 and the cantilever section 221 can be further improved. Also, the wall thickness of the cantilever section 221 is made larger, which can more effectively play a role of releasing stress and buffering vibration, and further enhance the effect of the cantilever section 221 to balance the overall stress of the pressure relief valve plate 2 during welding and service.

In some embodiments of the present application, referring to FIG. 4 again, at least the end of the welding section 223 away from the recess bottom wall 321 in the axial direction of the opening 31 (for example, the first direction X shown in FIG. 4) (for example, at least the upper end of the welding section 223 shown in FIG. 4) is entirely hot-melted as a welding mark (for example, the shaded area shown in FIG. 4) to form a partial recess wall of the clearance recess 224 by the welding mark. That is, after the pressure relief valve plate 2 is welded to the mounting member 3, the clearance recess 224 still exists, and the local recess wall of the clearance recess 224 is defined by the welding mark. Therefore, it shows that the size of the clearance recess 224 is sufficient. During the welding process, the clearance recess can always be used to release stress, which is beneficial to improve the effectiveness of the micro-deformation of the cantilever section 221 and the welding section 223, and plays a protective role in reducing the stress transfer to the weak area 211.

In some embodiments of the present application, referring to FIG. 6 and FIG. 7 again, the wall thickness T2 of the welding section 223 is 0.75-1.5 times the wall thickness T1 of the body part 21, such as 0.75, 0.8, 0.9, 1.0, 1.1, 1.2, 1.3, 1.4, 1.5 times, etc. It is worth noting that the welding section 223 can have an equal wall thickness structure or an unequal wall thickness structure. When it has an equal wall thickness structure, the wall thickness of the welding section 223 is a fixed value, and the value is the wall thickness T2. When it has an unequal wall thickness structure, the average wall thickness of the welding section 223 is the wall thickness T2.

Therefore, when the welding section 223 is welded to the recess side wall 322 of the sinking recess 32, by setting T2 to be greater than or equal to 0.75T1 and less than or equal to 1.5T1, the wall thickness of the welding section 223 may not be too thin, and there is a relatively sufficient thickness for hot melting, resulting in relatively high connection reliability after welding. Moreover, the wall thickness of the welding section 223 may not be too thick, and the molten pool formed during welding of the welding section 223 can spread into the clearance recess 224, improving the good fluidity of the molten pool, enhancing the welding quality, and being beneficial to release the welding stress and reducing the adverse effect of the welding stress on the weak area 211.

Exemplarily, the value range of T2 can be 0.5 mm-1 mm. For example, T2 can be 0.5 mm, 0.6 mm, 0.7 mm, 0.8 mm, 0.9 mm, 1 mm, etc. Thus, the thickness of the welding section 223 may not be too thin, and there is a relatively sufficient thickness for hot melting, resulting in relatively high connection reliability after welding. Moreover, the thickness of the welding section 223 may not be too thick, and the molten pool formed during welding of the welding section 223 can spread into the clearance recess 224, improving the good fluidity of the molten pool, enhancing the welding quality, and being beneficial to release the welding stress and reducing the adverse effect of the welding stress on the weak area 211.

Referring to FIG. 4 and FIG. 6 again, one side surface of two side surfaces of the welding section 223 in the wall thickness direction faces the clearance recess 224, and the other side surface faces the recess side wall 322 of the sinking recess 32, where one side wall face of the welding section 223 in the wall thickness direction facing the recess side wall 322 is the welding side wall 2231. In some embodiments of the present application, the welding side wall 2231 includes a welding wall section 22311 and a guide wall section 22312. The guide wall section 22312 is connected to the side of the welding wall section 22311 close to the recess bottom wall 321, and the guide wall section 22312 extends obliquely in the direction toward the recess bottom wall 321 and toward the body part 21 relative to the welding wall section 22311, for example, it can extend obliquely along an oblique line or along a curve.

Therefore, when the mounting part 22 is assembled to the sinking recess 32, since the guide wall section 22312 has an inwardly converging structure relative to the welding wall section 22311, the guide wall section 22312 can play a guiding role, improving the assembly efficiency of the pressure relief valve plate 2 and the mounting member 3, and enabling the assembly to proceed smoothly. Also, since the welding wall section 22311 has an outwardly expanding structure relative to the guide wall section 22312, the welding wall section 22311 can be utilized to stably match with the recess side wall 322 of the sinking recess 32, thereby improving the welding yield of the two. For example, the welding wall section 22311 can be set to match the shape of the recess side wall 322 of the sinking recess 32, so that the two can be in clearance fit or interference fit with a small clearance, thereby further improving the welding yield of the two.

Exemplarily, referring to FIG. 6 again, when the mounting part 22 includes the fourth chamfer 228, the fourth chamfer 228 may be set to be a chamfer or a fillet as the guide wall section 22312, so that it can be understood that when the guide wall section 22312 is provided, the problem of stress concentration at the connection between the welding section 223 and the connecting section 222 can be improved.

Referring to FIG. 6 and FIG. 7 again, in some embodiments of the present application, the size of the mounting part 22 satisfies condition four. The condition four is that the axial height H4 of the welding side wall 2231 is 1-5 times the wall thickness T1 of the body part 21, such as 1, 2, 3, 4, 5 times, etc. It is worth noting that the "axial height of the welding side wall 2231" refers to the height of the welding side wall 2231 in the axial direction of the opening 31 (for example, the first direction X shown in FIG. 6), such as the vertical distance between the upper end and the lower end of the welding side wall 2231 in the up-down direction shown in FIG. 6.

Therefore, by setting H4 to be greater than or equal to T1 and less than or equal to 5T1, when the welding side wall 2231 is welded to the recess side wall 322 of the sinking recess 32, the axial height of the welding side wall 2231 may not be too short, and there is a sufficient length to set the welding wall section 22311 and the guide wall section 22312, which is beneficial to optimize the welding effect of the welding wall section 22311 and the guiding effect of the guide wall section 22312. Moreover, the axial height of the welding side wall 2231 may not be too long, which can reduce the depth of the sinking recess 32 matched with the welding side wall 2231, contributing to reducing the thickness of the mounting member 3, facilitating the lightweight design, and reducing the space occupied by the mounting member 3.

Exemplarily, the value range of H4 can be 0.6 mm-2 mm, for example, H4 can be 0.6 mm, 0.7 mm, 0.8 mm, 0.9 mm, 1 mm, 1.1 mm, 1.2 mm, 1.3 mm, 1.4 mm, 1.5 mm, 1.6 mm, 1.7 mm, 1.8 mm, 1.9 mm, 2 mm, etc. Thus, the axial height of the welding side wall 2231 may not be too short, and there is a sufficient length to set the welding wall section 22311 and the guide wall section 22312, which is beneficial to optimize the welding effect of the welding wall section 22311 and the guiding effect of the guide wall section 22312. Moreover, the axial height of the welding side wall 2231 may not be too long, which can reduce the depth of the sinking recess 32 matched with the welding side wall 2231, contributing to reducing the thickness of the mounting member 3, facilitating the lightweight design, and reducing the space occupied by the mounting member 3.

In some embodiments of the present application, T3+H2=H4. When the wall thickness T3 of the connecting section 222 is set to be 0.75-1.2 times the wall thickness T1 of the body part 21, and the axial depth H2 of the clearance recess 224 is set to be 0.5-3 times the wall thickness T1 of the body part 21, the axial height of the welding side wall 2231 may not be too short, and there is a sufficient length to set the welding wall section 22311 and the guide wall section 22312, which is beneficial to optimize the welding effect of the welding wall section 22311 and the guiding effect of the guide wall section 22312. Moreover, the axial height of the welding side wall 2231 may not be too long, which can reduce the depth of the sinking recess 32 matched with the welding side wall 2231, contributing to reducing the thickness of the mounting member 3, facilitating the lightweight design, and reducing the space occupied by the mounting member 3.

Referring to FIG. 6 and FIG. 7 again, in some embodiments of the present application, the size of the mounting part 22 satisfies condition five. The condition five is that the axial height H3 of the welding wall section 22311 is 0.5-3 times the wall thickness T1 of the body part 21, such as 0.5, 1, 1.5, 2, 2.5, 3 times, etc. It is worth noting that the "axial height of the welding wall section 22311" refers to the height of the welding wall section 22311 in the axial direction of the opening 31 (for example, the first direction X shown in FIG. 6), such as the vertical distance between the upper end and the lower end of the welding wall section 22311 in the up-down direction shown in FIG. 6.

Therefore, by setting H3 to be greater than or equal to 0.5T1 and less than or equal to 3T1, when the welding wall section 22311 is welded to the recess side wall 322 of the sinking recess 32, the axial height of the welding wall section 22311 may not be too short, and there is a sufficient length for hot-melting, resulting in relatively high connection reliability after welding. Moreover, the axial height of the welding wall section 22311 may not be too long, which can reduce the depth of the sinking recess 32 welded to the welding wall section 22311, contributing to reducing the thickness of the mounting member 3, facilitating the lightweight design, and reducing the space occupied by the mounting member 3.

Exemplarily, the axial height H3 of the welding wall section 22311 can be further limited to be 0.5-2.4 times the wall thickness T1 of the body part 21, such as 0.5, 1, 1.5, 2, 2.4 times, etc. Thus, it can be further ensured that the axial height of the welding wall section 22311 is not too long, further reducing the depth of the sinking recess 32 welded to the welding wall section 22311, which is beneficial to reduce the thickness of the mounting member 3, facilitating the lightweight design, and reducing the space occupied by the mounting member 3.

Exemplarily, the value range of H3 can be 0.5 mm-1.2 mm, for example, H3 can be 0.5 mm, 0.6 mm, 0.7 mm, 0.8 mm, 0.9 mm, 1 mm, 1.1 mm, 1.2 mm, etc. Thus, the axial height of the welding wall section 22311 may not be too short, and there is a sufficient length for hot-melting, resulting in relatively high connection reliability after welding. Moreover, the axial height of the welding wall section 22311 may not be too long, which can reduce the depth of the sinking recess 32 welded to the welding wall section 22311, contributing to reducing the thickness of the mounting member 3, facilitating the lightweight design, and reducing the space occupied by the mounting member 3.

Referring to FIG. 6 and FIG. 7 again, in some embodiments of the present application, the size of the mounting part 22 satisfies condition six. The condition six is that the radial width W3 of the orthographic projection of the guide wall section 22312 along the axial direction of the opening 31 is 0.1-0.5 times the wall thickness T1 of the body part 21, such as 0.1, 0.2, 0.3, 0.4, 0.5 times, etc. It is worth noting that the "radial width of the orthographic projection of the guide wall section 22312 along the axial direction of the opening 31" refers to the dimension of the orthographic projection of the guide wall section 22312 along the axial direction of the opening 31 (for example, the first direction X shown in FIG. 6) in the radial direction of the opening 31 (for example, the second direction Y shown in FIG. 6), such as the horizontal distance between the left end and the right end of the guide wall section 22312 in the horizontal direction shown in FIG. 6.

Therefore, by setting W3 to be greater than or equal to 0.1T1 and less than or equal to 0.5T1, the radial width of the guide wall section 22312 may not be too small, and it has a more effective guiding effect. Also, when the radial widths of the mounting part 22 and the cantilever section 221 are fixed, the above setting ensures that the radial width of the guide wall section 22312 is not too large, leaving space for increasing the radial width of the connecting section 222, thereby improving the stability of the contact and support between the connecting section 222 and the recess bottom wall 321 and enhancing the positioning effect and welding quality when the pressure relief valve plate 2 is assembled to the mounting member 3.

Exemplarily, the value range of W3 can be 0.2 mm-0.4 mm, for example, W3 can be 0.2 mm, 0.25 mm, 0.3 mm, 0.35 mm, 0.4 mm, etc. Thus, the radial width of the guide wall section 22312 may not be too small, and it has a more effective guiding effect. Also, when the radial widths of the mounting part 22 and the cantilever section 221 are fixed, the above setting ensures that the radial width of the guide wall section 22312 is not too large, leaving space for increasing the radial width of the connecting section 222, thereby improving the stability of the contact and support between the connecting section 222 and the recess bottom wall 321 and enhancing the positioning effect and welding quality when the pressure relief valve plate 2 is assembled to the mounting member 3.

In addition, in some embodiments of the present application, the size of the mounting part 22 can satisfy condition four and condition five simultaneously, so that the axial length of the guide wall section 22312 may not be too long or too short, and the guiding effect can be improved while the processability is satisfied.

Figure 8:
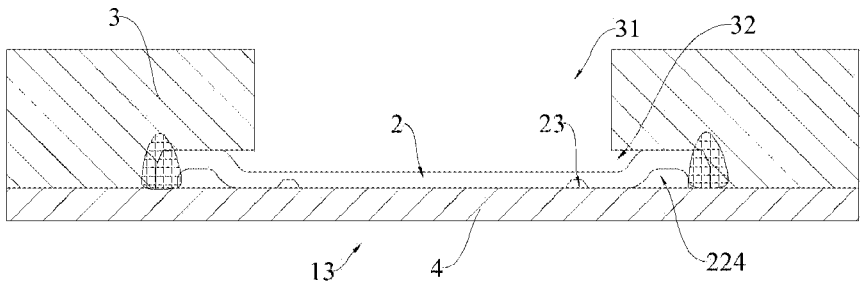
FIG. 8 is an application sectional view of a pressure relief component provided in some embodiments of the present application.
Figure 9:
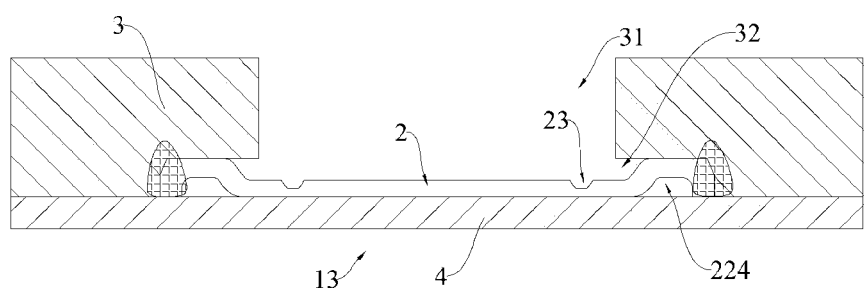
FIG. 9 is an application sectional view of a pressure relief component provided in some other embodiments of the present application.
Figure 10:
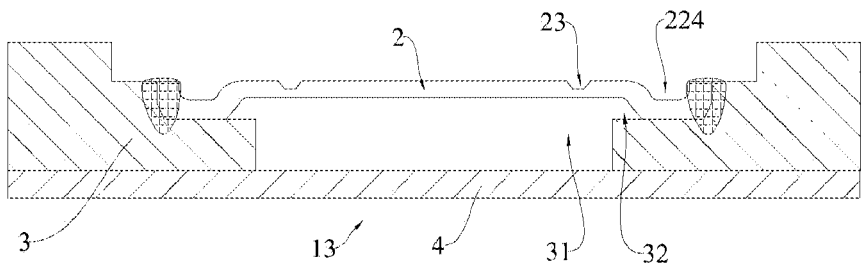
FIG. 10 is an application sectional view of a pressure relief component provided in yet other embodiments of the present application.
Figure 11:
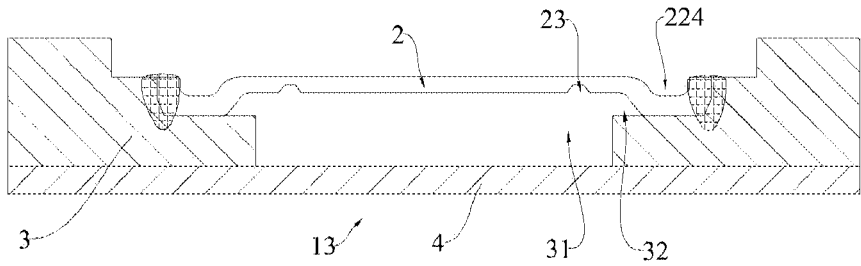
FIG. 11 is an application sectional view of a pressure relief component provided in still other embodiments of the present application.

Referring to FIG. 8-FIG. 11, FIG. 8 is an application sectional view of a pressure relief component 201 provided in some embodiments of the present application, FIG. 9 is an application sectional view of a pressure relief component 201 provided in some other embodiments of the present application, FIG. 10 is an application sectional view of a pressure relief component 201 provided in still other embodiments of the present application, and FIG. 11 is an application sectional view of a pressure relief component 201 provided in yet other embodiments of the present application. In some embodiments of the present application, the mounting member 3 has a first side and a second side in the thickness direction. The sinking recess 32 is formed on the end wall of the first side of the mounting member 3, and the notch 323 of the sinking recess opens toward the first side; or the sinking recess 32 is formed on the end wall of the second side of the mounting member 3, and the notch 323 of the sinking recess opens toward the direction of the second side.

Exemplarily, the first side of the mounting member 3 is an inner side, and the inner side of the mounting member 3 is suitable for forming the accommodating cavity 13. The accommodating cavity 13 can be used for mounting the electrode assembly of the battery cell 20. A side of the mounting member 3 facing away from the accommodating cavity 13 is a second side, that is, an outer side of the mounting member 3. At this time, an inner side wall of the mounting member 3 constitutes an end wall of the first side, and an outer side wall of the mounting member 3 constitutes an end wall of the second side. Exemplarily, in combination with FIG. 3, when the housing 1 of the battery cell 20 includes the housing body 11 and the housing cover 12, the accommodating cavity 13 is formed between the housing body 11 and the housing cover 12. Both the housing body 11 and the housing cover 12 can serve as the mounting member 3. The side wall face of the mounting member 3 facing the accommodating cavity 13 is the inner side wall, and the side wall face of the mounting member 3 facing away from the accommodating cavity 13 is the outer side wall.

As shown in FIG. 8 and FIG. 9, in some embodiments of the present application, the sinking recess 32 is formed on the inner side wall of the mounting member 3, and the notch 323 of the sinking recess opens toward the accommodating cavity 13. At this time, the notch of the clearance recess 224 also opens toward the accommodating cavity 13, so that the connecting section 22 can be supported on the recess bottom wall 321. Therefore, the pressure relief valve plate 2 can be mounted on the side of the mounting member 3 facing the accommodating cavity 13. For example, other components of the battery cell 20 can be assembled after the pressure relief valve plate 2 is welded to the mounting member 3.

Alternatively, as shown in FIGS. 10 and 11, in some other embodiments of the present application, the sinking recess 32 is formed on the outer side wall of the mounting member 3, and the notch 323 of the sinking recess opens toward a direction away from the accommodating cavity 13. At this time, the notch of the clearance recess 224 also opens toward a direction away from the accommodating cavity 13, so that the connecting section 22 can be supported on the recess bottom wall 321. Therefore, the pressure relief valve plate 2 can be mounted on the side of the mounting member 3 facing away from the accommodating cavity 13. For example, other components of the battery cell 20 can be assembled first, and then the pressure relief valve plate 2 can be welded to the mounting member 3.

Therefore, since the pressure relief valve plate 2 in the embodiments of the present application is not limited to being mounted on the inner side or the outer side of the mounting member 3, the flexible mounting of the pressure relief valve plate 2 can be achieved, and the mounting requirements of different forms of the mounting member 3 can be met, enriching the applicable scenarios of the pressure relief valve plate 2. When the pressure relief valve plate 2 is mounted on the side of the mounting member 3 facing away from the accommodating cavity 13, the conductive metal such as welding slag can be effectively prevented from falling into the accommodating cavity 13, thereby improving the reliability of the battery cell 20.

Figure 12:
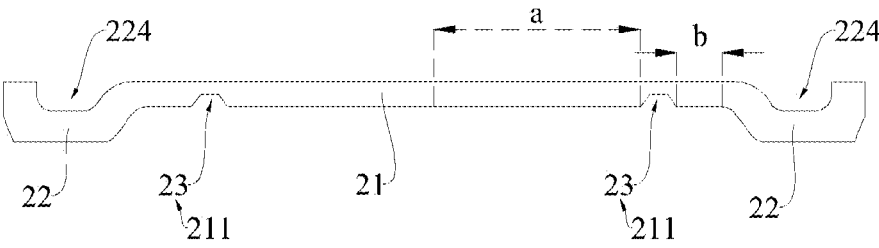
FIG. 12 is a schematic structural diagram of a pressure relief valve plate provided in some other embodiments of the present application.

In combination with FIG. 12, FIG. 12 is a schematic structural diagram of a pressure relief valve plate 2 provided in some other embodiments of the present application. In some embodiments of the present application, the weak area 211 is the thinning recess 23. The thinning recess 23 is in the shape of a blind recess, and the opening direction is the same as that of the clearance recess 224 (as shown in FIG. 8 and FIG. 10) or opposite to that of the clearance recess (as shown in FIG. 9 and FIG. 11). Therefore, since the opening direction of the thinning recess 23 can be the same as or opposite to the opening direction of the clearance recess 224, the flexible processing of the pressure relief valve plate 2 can be achieved, and the requirements of different application scenarios can be met, enriching the applicable scenarios of the pressure relief valve plate 2. In addition, when the thinning recess 23 opens toward the accommodating cavity 13, it can serve as a buffer structure for accommodating the generated gas.

In some embodiments of the present application, a contour line of the thinning recess 23 (that is, a contour line of an orthographic projection of the thinning recess 23 on the body part 21 along the axial direction of the opening 31) is of an annular shape with an opening that has the same shape as a contour of the pressure relief valve plate 2 and is concentrically disposed. That is, on a projection plane perpendicular to the axial direction of the opening 31, a part remaining after a section of the annular line obtained by reducing the contour line of the pressure relief valve plate 2 by some multiples (which can be, but is not limited to, integer multiples) is missing can be the contour line of the thinning recess 23. For example, if the contour shape of the pressure relief valve plate 2 is a racetrack shape, the contour line of the thinning recess 23 is a racetrack shape with an opening. For example, if the contour shape of the pressure relief valve plate 2 is an ellipse, the contour line of the thinning recess 23 is an ellipse with an opening. For example, if the contour shape of the pressure relief valve plate 2 is a rectangle, the contour line of the thinning recess 23 is a rectangle with an opening. Moreover, the distance between the thinning recess 23 and the center of the mounting part 22 is greater than the distance between the thinning recess 23 and the edge of the mounting part 22, that is, the thinning recess 23 is set to be closer to the edge of the mounting part 22 relative to the center of the mounting part 22. That is, on any radial line of the pressure relief valve plate 2 on the above projection plane, the distance between the thinning recess 23 and the center of the mounting part 22 (for example, the distance a shown in FIG. 12) is greater than the distance between the thinning recess 23 and the edge of the mounting part 22 (for example, the distance b shown in FIG. 12), that is, a is greater than b. Therefore, the profile of the thinning recess 23 is simple and easy to process, and the valve opening can be more reliably achieved.

It is worth noting that the shape of the contour line of the thinning recess 23 is not limited to the above. For example, the shape of the orthographic projection of the thinning recess 23 on the body part 21 along the axial direction of the opening 31 can also be a shape of two intersecting lines, a hyperbolic shape, or the like.

In some embodiments of the present application, the mounting part 22 and the body part 21 are stamped out on the pressure relief valve plate 2, and the body part 21 has a flat plate structure with an equal thickness. Therefore, the manufacturing process of the pressure relief valve plate 2 is simple, and it can be easily realized that the wall thickness of each position of the mounting part 22 meets the design requirements. Also, since the bent form of the mounting part 22 can play a role in protecting the weak area 211, the body part 21 does not need to be specially processed to protect the weak area 211, and a flat plate structure with an equal thickness is sufficient, which is beneficial to simplify the structure and processing of the body part 21.

It is worth noting that the weak area 211 and the body part 21 can be processed and formed together. For example, they can be stamped and formed together. Alternatively, the weak area can be processed on the body part 21 subsequently after the body part 21 is processed and formed. For example, the weak area 211 can be processed by subsequent laser etching and other methods, and the present application is not limited thereto.

According to some embodiments of the present application, referring to FIG. 3 and FIG. 4 again, the present application further provides a battery cell 20, including: a housing 1 and an electrode assembly. The electrode assembly is disposed in the housing 1, and the housing 1 includes the pressure relief component 201 of any of the above embodiments. Since the service reliability and stability of the pressure relief component 201 of the embodiments of the present application can be improved, it is beneficial to improve the service reliability and stability of the battery cell 20.

In some embodiments of the present application, referring to FIG. 3 and FIG. 4 again, the housing 1 includes a housing body 11 and a housing cover 12. The housing cover 12 covers the open position of the housing body 11, and one of the housing body 11 and the housing cover 12 constitutes the mounting member 3. That is, the pressure relief valve plate 2 can be mounted on either the housing body 11 or the housing cover 12, so that the mounting position of the pressure relief valve plate 2 can be flexibly selected to improve the design flexibility of the battery cell 20.

In some embodiments of the present application, referring to FIG. 8-FIG. 11 again, an insulating member 4 can also be disposed on the inner side of the mounting member 3. The insulating member 4 can be used to isolate the electrical connection components in the accommodating cavity 13 from the mounting member 3, so as to reduce the risk of a short circuit. Exemplarily, the insulating member 4 can be plastic, rubber, or the like.

According to some embodiments of the present application, the present application further provides a battery 100, including one or more battery cells 20 of any of the above embodiments. Since the service reliability and stability of the battery cell 20 of the embodiments of the present application can be improved, it is beneficial to improve the service reliability and stability of the battery 100.

According to some embodiments of the present application, the present application further provides an electrical apparatus, including the battery 100 of any of the above embodiments, and the battery 100 is used to supply electrical energy to the electrical apparatus. Since the service reliability and stability of the battery 100 of the embodiments of the present application can be improved, it is beneficial to improve the working reliability and stability of the electrical apparatus.

According to some embodiments of the present application, referring to FIG. 3-FIG. 7 and FIG. 10, a battery cell 20 is provided. The battery cell 20 includes: a housing 1 and an electrode assembly. The housing 1 includes a housing body 11 and a housing cover 12. The housing cover 12 covers the open position of the housing body 11 to define an accommodating cavity 13 between the housing body 11 and the housing cover 12, and the electrode assembly is disposed in the accommodating cavity 13. The housing cover 12 has an opening 31. A sinking recess 32 is disposed around the circumferential direction of the opening 31 on the housing cover 12. The sinking recess 32 includes a recess bottom wall 321 and a recess side wall 322. The sinking recess 32 is formed on the outer side wall of the housing cover 12, and the notch 323 of the sinking recess opens toward a direction away from the accommodating cavity 13. The housing cover 12 is provided with a pressure relief valve plate 2. The pressure relief valve plate 2 covers the opening 31 and includes a body part 21 and a mounting part 22. The body part 21 has a flat plate structure with an equal thickness, and a weak area 211 in the form of a thinning recess 23 is provided on the body part 21. The mounting part 22 is connected to the outer circumference of the body part 21 and is bent, so as to be supported on the recess bottom wall 321 and welded to the recess side wall 322.

The mounting part 22 includes a cantilever section 221, a connecting section 222 and a welding section 223 sequentially connected from inside to outside in the radial direction of the opening 31. The connecting section 222 is connected to the cantilever section 221 and the welding section 223 through chamfers, respectively. The connecting section 222 is supported on the recess bottom wall 321. The cantilever section 221 is suspended above the opening 31 and/or the sinking recess 32, and both the cantilever section 221 and the welding section 223 extend toward the notch 323 of the sinking recess relative to the connecting section 222 to form a clearance recess 224 between the cantilever section 221, the connecting section 222 and the welding section 223. The notch of the clearance recess 224 also opens toward the direction away from the accommodating cavity 13. The orthographic projection of the weak area 211 in the radial direction of the opening 31 falls within the clearance recess 224, and the welding section 223 is welded to the recess side wall 322.

A side surface of the connecting section 222 facing the recess bottom wall 321 includes a first planar section 2221, the first planar section 2221 is an annular plane surrounding the entire circumference of the body part 21, the first planar section 2221 is in surface contact and support fit with the recess bottom wall 321, a side surface of the connecting section 222 away from the recess bottom wall 321 includes a second planar section 2222, and an orthographic projection of the second planar section 2222 along the axial direction of the opening 31 falls within the first planar section 2221.

One end of the cantilever section 221 away from the connecting section 222 is connected to an edge of the body part 21 through a chamfer, the cantilever section 221 extends obliquely relative to the body part 21 along a direction from the body part 21 to the connecting part, and at least an end of the welding section 223 away from the recess bottom wall 321 is entirely hot-melted into a welding mark, so that the welding mark forms a partial recess wall of the clearance recess 224. A side wall surface of the welding section 223 facing the recess side wall 322 in the wall thickness direction is a welding side wall 2231, the welding side wall 2231 includes a welding wall section 22311 and a guide wall section 22312, the guide wall section 22312 is connected to a side of the welding wall section 22311 close to the recess bottom wall 321, and the guide wall section 22312 extends obliquely in a direction toward the recess bottom wall 321 and in a direction gradually approaching the body part 21 relative to the welding wall section 22311.

Therefore, according to the battery cell 20 of this embodiment, the adverse effect of the welding tensile stress on the weak area 211 of the pressure relief valve plate 2 can be effectively improved, and the stress distribution of the pressure relief valve plate 2 during the service process can be improved, so that the stress is more uniform, the vibration resistance and fatigue resistance of the pressure relief valve plate 2 are improved, and the service reliability and stability of the battery cell 20 are further improved. In addition, by mounting the pressure relief valve plate 2 on the side of the housing cover 12 facing away from the accommodating cavity 13, the conductive metal such as welding slag can be more effectively prevented from falling into the accommodating cavity 13, thereby improving the reliability of the battery cell 20.

It should be noted that, without contradictory, the embodiments in the present application may be combined with the features in the embodiments.

The above descriptions are merely preferred embodiments of the present application, and are not intended to limit the present application. For a person skilled in the art, various modifications and changes may be made to the present application. Any modification, equivalent replacement, or improvement made without departing from the spirit and principle of the present application shall fall within the protection scope of the present application.

What is claimed is:

1. A pressure relief component for a battery cell, comprising:
   a mounting member provided with an opening, wherein the mounting member is provided with a sinking recess around a circumferential direction of the opening, and the sinking recess comprises a recess bottom wall and a recess side wall; and
   a pressure relief valve plate, covering the opening and comprising a body part and a mounting part, wherein the body part is provided with weak areas, and the mounting part is connected to a periphery of the body part and are bent to be supported on the recess bottom wall and welded to the recess side wall,
   wherein the mounting part comprises a cantilever section, a connecting section and a welding section sequentially connected from inside to outside in a radial direction of the opening, the connecting section is supported on the recess bottom wall, the cantilever section is suspended in the opening and/or the sinking recess, and the cantilever section and the welding section are both bent toward a notch of the sinking recess relative to the connecting section, so that a clearance recess is formed among the cantilever section, the connecting section and the welding section, and the welding section is welded to the recess side wall.

2. The pressure relief component according to claim 1, wherein a side surface of the connecting section facing the recess bottom wall comprises a first planar section, and the first planar section is in surface contact and support fit with the recess bottom wall, wherein
   the first planar section is an annular plane surrounding an entire circumference of the body part, and/or
   a side surface of the connecting section away from the recess bottom wall comprises a second planar section, and at least a part of a projection of the second planar section on the first planar section along an axial direction of the opening falls within the first planar section, wherein a radial width of the second planar section is smaller than a radial width of the first planar section; and/or the radial width of the first planar section is 0.5-8 times a wall thickness of the body part, and the radial width of the second planar section is 0.1-5 times the wall thickness of the body part.

3. The pressure relief component according to claim 1, wherein a wall thickness of the connecting section is 0.75-1.2 times the wall thickness of the body part; and/or an axial depth of the clearance recess is 0.5-3 times the wall thickness of the body part.

4. The pressure relief component according to claim 1, wherein a projection of the weak area on the mounting part along the radial direction of the opening falls within the clearance recess, wherein a projection of the body part on the mounting part along the radial direction of the opening entirely falls within the clearance recess.

5. The pressure relief component according to claim 1, wherein the connecting section is connected to at least one of the cantilever section and the welding section through a chamfer.

6. The pressure relief component according to claim 1, wherein an end of the cantilever section away from the connecting section is bent and connected to an edge of the body part, so that the cantilever section is inclined relative to the body part, wherein an axial height difference between a surface of the body part on a thickness side close to the recess bottom wall and a surface of the connecting section on the thickness side close to the recess bottom wall is 0.5-2 times a wall thickness of the body part, wherein a wall thickness of the cantilever section is greater than or equal to the wall thickness of the body part, wherein the wall thickness of the cantilever section is 1.1-1.8 times the wall thickness of the body part, and/or the body part is connected to the cantilever section through a chamfer.

7. The pressure relief component according to claim 1, wherein at least an end of the welding section away from the recess bottom wall is entirely hot-melted into a welding mark, so that the welding mark constitutes a partial recess wall of the clearance recess.

8. The pressure relief component according to claim 1, wherein a wall thickness of the welding section is 0.75-1.5 times the wall thickness of the body part.

9. The pressure relief component according to claim 1, wherein a side wall face of the welding section facing the recess side wall in a wall thickness direction is a welding side wall, the welding side wall comprises a welding wall section and a guide wall section, the guide wall section is connected to a side of the welding wall section close to the recess bottom wall, and the guide wall section extends obliquely in a direction toward the recess bottom wall and in a direction gradually approaching the body part relative to the welding wall section, wherein an axial height of the welding side wall is 1-5 times the wall thickness of the body part;

an axial height of the welding wall section is 0.5-3 times the wall thickness of the body part; and/or a radial width of an orthographic projection of the guide wall section along the axial direction of the opening is 0.1-0.5 times the wall thickness of the body part.

10. The pressure relief component according to claim 1, wherein the weak area is a thinning recess, and an opening direction of the thinning recess is the same as or opposite to an opening direction of the clearance recess.

11. The pressure relief component according to claim 10, wherein a contour line of the thinning recess is of an annular shape with an opening having a same contour shape as the pressure relief valve plate and being concentrically disposed, and a distance between the thinning recess and a center of the mounting part is greater than a distance between the thinning recess and an edge of the mounting part.

12. The pressure relief component according to claim 1, wherein the mounting member has a first side and a second side in a thickness direction, the sinking recess is formed on an end wall of the first side of the mounting member, and the notch of the sinking recess opens toward a direction of the first side; or the sinking recess is formed on an end wall of the second side of the mounting member, and the notch of the sinking recess opens toward a direction of the second side.

13. The pressure relief component according to claim 1, wherein the pressure relief valve plate is stamped to form the mounting part and the body part, and the body part is of a flat plate structure with an equal thickness.

14. A battery cell, comprising: a housing and an electrode assembly, wherein the electrode assembly is disposed in the housing, and the housing comprises the pressure relief component according to claim 1.

15. The battery cell according to claim 14, wherein the housing comprises a housing body and a housing cover, the housing cover covers an open position of the housing body, and one of the housing body and the housing cover constitutes the mounting member.

16. A battery, comprising the battery cell according to claim 14.

17. An electrical apparatus, comprising the battery according to claim 16.

* * * * *